US012718253B1

(12) United States Patent
Chan et al.

(10) Patent No.: US 12,718,253 B1
(45) Date of Patent: Aug. 25, 2026

(54) AUTOMATED ACTIONS FOR FACILITATING TRANSACTIONS

(71) Applicant: Avalara, Inc., Seattle, WA (US)

(72) Inventors: Andrew Brandon Chan, Chapel Hill, NC (US); Kathryn Rust, Durham, NC (US); Jeffrey Carroll, Boulder, CO (US)

(73) Assignee: Avalara, Inc., Seattle, WA (US)

( * ) Notice: Subject to any disclaimer, the term of this patent is extended or adjusted under 35 U.S.C. 154(b) by 982 days.

(21) Appl. No.: 16/943,617

(22) Filed: Jul. 30, 2020

Related U.S. Application Data

(60) Provisional application No. 63/039,907, filed on Jun. 16, 2020, provisional application No. 63/039,906, (Continued)

(51) Int. Cl.
*G06Q 30/018* (2023.01)

(52) U.S. Cl.
CPC ....... *G06Q 30/018* (2013.01); *G06Q 2220/18* (2013.01)

(58) Field of Classification Search
CPC .. G06Q 30/018; G06Q 20/405; G06Q 20/389; G06Q 2220/18; G06Q 30/06; (Continued)

(56) References Cited

U.S. PATENT DOCUMENTS 6,993,502 B1 1/2006 Gryglewicz et al.
7,188,083 B2 3/2007 Agee et al.
(Continued)

FOREIGN PATENT DOCUMENTS

EP 1359523 A1 11/2003
WO 99/40528 A1 8/1999
(Continued)

OTHER PUBLICATIONS

Avalara for beverage alcohol now features shipping verification, providing real-time compliance for direct-to-consumer sellers. (Apr. 21, 2021). (Year: 2021).*

(Continued)

*Primary Examiner* — Maria C Santos-Diaz
(74) *Attorney, Agent, or Firm* — Jeremiah J. Baunach; Frontier IP Law PLLC

(57) ABSTRACT

Systems and methods enable automated compliance verifications against regulatory and licensing requirements so sellers can determine whether they can sell to a given destination and which goods and services they can sell to that destination. The system increases efficiency of automated computerized systems that facilitate transactions by enabling users and systems to auto-generate applications and renewals based on existing data in such system(s). The system identifies the good or services contained within a transaction and queries a database of licenses and product registrations to validate that the proper documentation for the transaction exists. If the proper documentation does not exist, internal parties, or applications, are automatically notified and the system automatically initiates the application and/or renewal process for the goods or services for those taxing and regulatory authorities applicable to the transaction.

28 Claims, 15 Drawing Sheets

Related U.S. Application Data filed on Jun. 16, 2020, provisional application No. 63/039,903, filed on Jun. 16, 2020, provisional application No. 62/990,789, filed on Mar. 17, 2020.

(58) Field of Classification Search
CPC .... G06Q 40/03; G06Q 20/4016; G06Q 40/08; G06Q 20/0855; G06Q 20/3825; G06Q 20/3821; G06Q 10/0633; G06Q 20/401; G06Q 2220/00; G06Q 20/02; G06Q 20/382
See application file for complete search history.

(56) References Cited

U.S. PATENT DOCUMENTS 7,249,072 B1 7/2007 Nearhood et al.
7,398,239 B2 7/2008 Barsade et al.
7,783,536 B2 8/2010 William et al.
7,933,803 B1 4/2011 Nadler et al.
8,583,518 B2 11/2013 Luongo
8,620,578 B1 12/2013 Brown et al.
8,725,407 B2 5/2014 Hurley et al.
9,760,915 B2 9/2017 Pavlou et al.
10,445,818 B1 10/2019 Chowdhary
10,719,842 B1 * 7/2020 Gharavy ................ G06Q 30/02
10,769,611 B2 9/2020 McNeel
11,798,007 B1 * 10/2023 Maselli ................ G06Q 30/018
2002/0052792 A1 5/2002 Johnson et al.
2002/0138765 A1 9/2002 Fishman et al.
2002/0188535 A1 * 12/2002 Chao ...................... G06Q 40/02 705/35
2004/0002906 A1 1/2004 Von et al.
2004/0230525 A1 11/2004 Barsade et al.
2005/0071246 A1 * 3/2005 Smith .................... G06Q 30/06 705/26.1
2006/0085305 A1 4/2006 Sindambiwe
2007/0136158 A1 6/2007 Rawlings et al.
2007/0136159 A1 6/2007 Rawlings et al.
2008/0120129 A1 5/2008 Seubert et al.
2009/0119193 A1 * 5/2009 Selleck .................. G06Q 10/10 705/30
2009/0240541 A1 * 9/2009 Smith .................... G06Q 30/06 705/317
2010/0306071 A1 12/2010 Kay
2011/0066455 A1 * 3/2011 Lobo ................. G06Q 30/0633 705/26.8
2012/0030045 A1 2/2012 Smith, III
2012/0197759 A1 8/2012 Neely et al.
2013/0013471 A1 1/2013 Fishman
2013/0085913 A1 4/2013 Luongo
2013/0238454 A1 9/2013 Agee et al.
2013/0317942 A1 * 11/2013 Cullen, III ......... G06Q 30/0641 705/26.35
2014/0172526 A1 6/2014 Arrocho et al.
2014/0337180 A1 11/2014 Dvorak et al.
2014/0337189 A1 11/2014 Barsade et al.
2014/0379531 A1 12/2014 Huang et al.
2017/0011377 A1 1/2017 Stone
2018/0204213 A1 * 7/2018 Zappier ................... H04L 63/08
2018/0268420 A1 * 9/2018 Maselli .................. G06Q 10/10
2019/0180383 A1 6/2019 Reiskind et al.
2019/0340703 A1 11/2019 West et al.
2019/0362430 A1 * 11/2019 Jass ........................ G06Q 40/08
2020/0042964 A1 2/2020 Roach et al.
2021/0049552 A1 * 2/2021 Dolan .................... G06Q 10/10
2021/0233181 A1 7/2021 Bubalo et al.

FOREIGN PATENT DOCUMENTS

WO 01/35678 A2 5/2001
WO 2002/101487 A2 12/2002
WO 2018/178884 A1 10/2018

OTHER PUBLICATIONS

Santos, Henrique. "Comparison and Evaluation of Organizational Transactions for Continuous Auditing and Business Compliance." International journal of information system modeling and design. 9.2 (2018) (Year: 2018).*

A. Burunova, A. Ponomarev and N. Teslya, "Enactable Electronic Contracts in E-Commerce: Models, Technologies and Architectures," 2019 24th Conference of Open Innovations Association (FRUCT), Moscow, Russia, 2019, pp. 54-59, doi: 10.23919/FRUCT.2019.8711951. (Year: 2019).*

Grigg, Ian. (2005). Triple Entry Accounting. 10.13140/RG.2.2.12032.43524. (Year: 2005).*

P. Pant, R. Bathla and S. K. Khatri, "A Model to Implement and Secure Online Documentation using Blockchain," 2019 4th International Conference on Information Systems and Computer Networks (ISCON), Mathura, India, 2019, pp. 174-178, doi: 10.1109/ISCON47742.2019.9036245. (Year: 2019).*

S. Mthethwa, N. Dlamini and G. Barbour, "Proposing a Blockchain-based Solution to Verify the Integrity of Hardcopy Documents," 2018 International Conference on Intelligent and Innovative Computing Applications (ICONIC), Mon Tresor, Mauritius, 2018, pp. 1-5, doi: 10.1109/ICONIC.2018.8601200 (Year: 2018).*

P. Assamongkol, S. Phimoltares and S. Panthuwadeethorn, "Enhancing trustworthy of document using a combination of image hash and cryptographic hash," 2017 14th International Joint Conference on Computer Science and Software Engineering (JCSSE), NakhonSiThammarat, Thailand, 2017, pp. 1-6, doi: 10.110 (Year: 2017).*

Bucks, Dan R., "Airbnb Agreements with State and Local Tax Agencies—A Formula for Undermining Tax Fairness, Transparency, and the Rule of Law," Mar. 2017, 55 pages.

* cited by examiner

AUTOMATED ACTIONS FOR FACILITATING TRANSACTIONS

TECHNICAL FIELD

The technical field relates to transaction systems, and particularly to automated actions facilitating transactions.

BRIEF SUMMARY

Ensuring compliance with technical requirements of regulations regarding licensing and registration of the goods, services and parties of a transaction often slows down the automated processes of completing the transaction and providing the goods and services. As one example, a winery may need to perform a manual compliance verification to determine whether a case of wine can be shipped from California to South Dakota as part of a specific transaction. The compliance verification determines that the shipment is compliant with direct to consumer shipping laws and regulations. If during such a compliance verification it is discovered that the winery does not have an active current license or product registration in the state of South Dakota, this may cause significant delay in the automated systems that facilitate and/or perform the transaction and shipping of the wine. Such systems may include enterprise resource planning ("ERP") software applications or accounting applications. ERP applications manage information relating to a business's activities, such as sales, resource management, production, inventory management, delivery, billing, and so on.

To solve the above technical problems, the systems and methods disclosed herein enable automated compliance verifications against registration and licensing requirements so sellers can determine whether they can sell to a given destination and which goods and services they can sell to that destination. As such licensing and registration requirements are cumbersome for businesses and computerized systems that facilitate transactions, this system increases the efficiency of automated computerized systems that facilitate transactions by enabling users and systems to auto-generate applications and renewals based on data that already exists in such systems.

Furthermore, governments cannot enforce license and registration requirements without auditing the activity of a business. However, businesses are constantly "catching up" to maintain compliance with new rules and regulations. In conjunction with the automated license/registration verifications, a triple entry ledger system disclosed herein improves automated computerized systems that facilitate transactions by enabling such systems to more efficiently ensure that all parties are acting in compliance without penalizing one side or another.

Additionally, end consumers do not have a reliable source of information to know which sellers are compliant in their jurisdictions or other domains, and which products are lawfully authorized for sale. Governments would also like to move towards "real-time" compliance authorizations to approve transactions before they are consummated by sellers and buyers in order to ensure proper tax payments and to properly monitor movements of goods. This presents technological problems that must be overcome in order to do this for which the present disclosure provides technical solutions. For example, such a technical solution may include electronically obtaining data regarding a potential transaction; based on the data regarding the potential transaction, automatically looking up one or more certain conditions that must be met for the transaction to proceed; automatically determining whether or not a particular one of the one or more certain conditions is met. In response to a determination that the particular condition is not met, the system electronically identifies actions to be taken that will result in the particular condition being met for the potential transaction to proceed and electronically initiates the identified actions. Such actions may include automatically generating and transmitting the electronic license or registration application documents and enabling licensing and product registration to be "auto-approved" by the system, both based on existing system information regarding the transaction and published rules and forms which stipulate requirements for approval. Thus, as sellers don't always know which products and/or services they are going to sell in given jurisdictions, the present disclosure enables them to do "just-in-time" registrations and/or licensing based on which items customers request in which jurisdictions, thus increasing the efficiency of computerized systems that facilitate transactions.

An automated service provider may integrate, or extract, information from systems that originate transactions across a variety of industries. However, these systems are unaware of the compliance requirements of transacting certain goods or services. The present disclosure provides a technical solution by automatically identifying the good or services contained within a transaction and querying a database of licenses, registrations, and product registrations (also known as brand registrations, label registrations, or brand label registrations) to validate that the proper documentation for the transaction exists. If the proper documentation does not exist, internal parties, or applications, are automatically notified and the system automatically initiates the application and/or renewal process for said goods or services for all taxing and regulatory authorities applicable to the transaction.

As shown above and in more detail throughout the present disclosure, the present disclosure provides technical improvements to existing computerized systems to enable real-time enforcement of licensing and registration requirements from regulatory authorities and a real-time compliance process for sellers and providers of goods and services.

BRIEF DESCRIPTION OF THE SEVERAL VIEWS OF THE DRAWINGS

The components in the drawings are not necessarily drawn to scale relative to each other. Like reference numerals designate corresponding parts throughout the several views.

DETAILED DESCRIPTION

Figure 1:
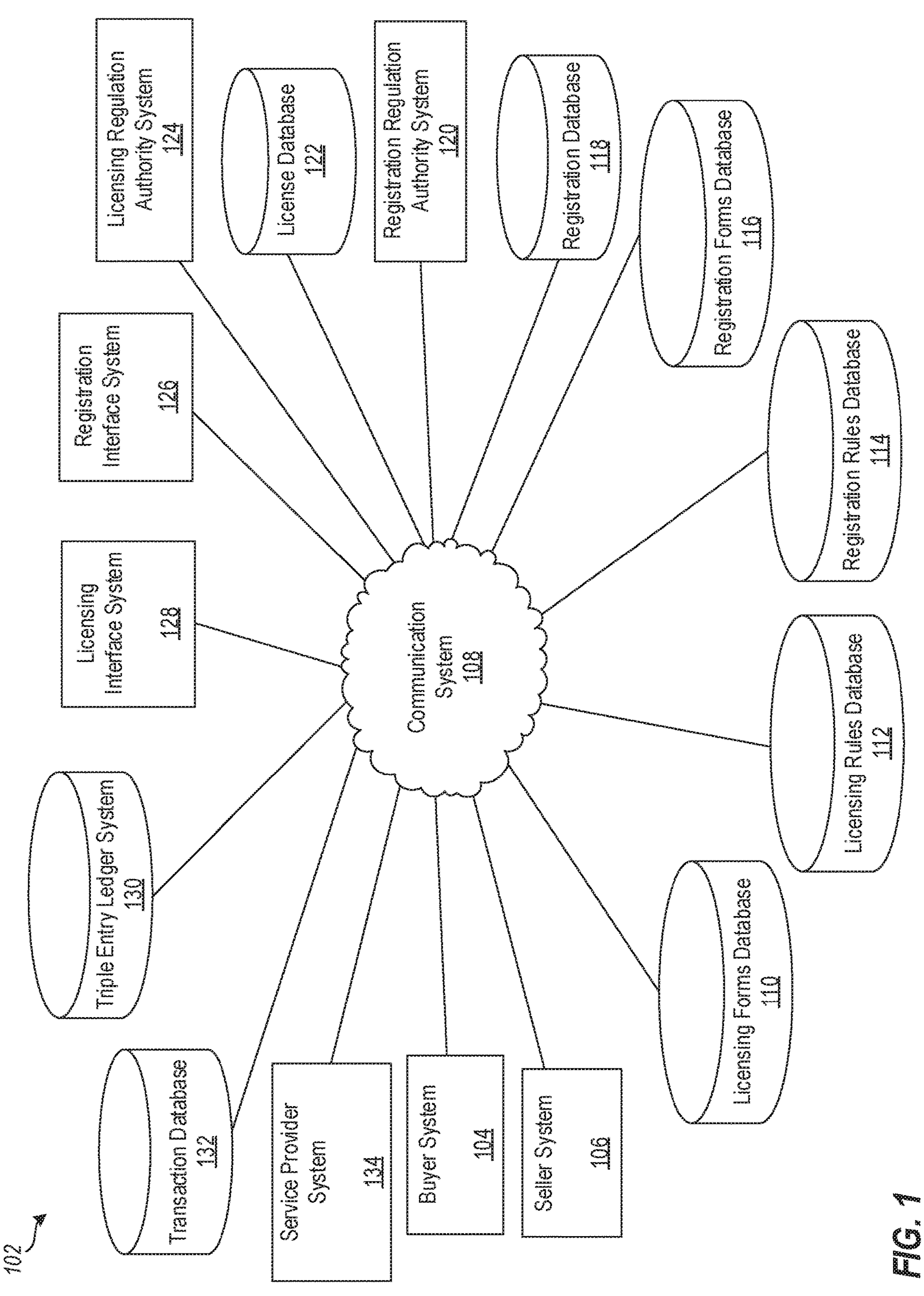
FIG. 1 is an overview block diagram illustrating an example system for automated actions for facilitating transactions and a technical environment in which the system may be implemented that is an improvement in automated computerized systems, according to various embodiments of the present disclosure.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, that embodiments of the inventive subject matter may be practiced without these specific details. In general, well-known structures and methods associated with underlying technology have not been shown or described in detail to avoid unnecessarily obscuring descriptions of the preferred embodiments.

Determining compliance with technical requirements of regulations regarding licensing and registration of the goods, services and parties of a transaction presents a technical problem for current ERP applications and often slows down the automated processes of completing the transaction and providing the goods and services. In one embodiment, being registered is having had one's name, enterprise, product or service added to an official list or entered into a register and being licensed is a person or enterprise having been issued with a license (by the required authority) for the potential transaction.

An automated service provider may integrate, or extract, information from systems that originate transactions across a variety of industries. However, these systems are unaware of the registration and licensing compliance requirements of transacting certain goods or services. To solve such technical problems, systems and methods of the present disclosure identify the good or services contained within a transaction and query a database of licenses, registrations, and product registrations (also known as brand registrations, label registrations, or brand label registrations) to validate that the proper documentation for the transaction exists. If the proper documentation does not exist, internal parties, or applications, are automatically notified and the system automatically initiates the application and/or renewal process for said goods or services for all applicable taxing and regulatory authorities. As sellers don't always know which products/services they are going to sell in given jurisdictions, the present disclosure enables them to do "just-in-time" registrations and/or licensing based on which items customers request in which jurisdictions or other domains, thus increasing the efficiency of computerized systems that facilitate transactions.

Therefore, the systems and methods described herein for automated actions for facilitating transactions improves the functioning of computer or other hardware, such as by reducing the processing, storage, and/or data transmission resources needed to perform various tasks, thereby enabling the tasks to be performed by less capable, capacious, and/or expensive hardware devices, and/or be performed with less latency, and/or preserving more of the conserved resources for use in performing other tasks or additional instances of the same task.

FIG. 1 is an overview block diagram illustrating an example system 102 for automated actions for facilitating transactions and a technical environment in which the system may be implemented that is an improvement in automated computerized systems, according to various embodiments of the present disclosure.

Before providing additional details regarding the operation and constitution of methods and systems for automated actions for facilitating transactions, the example technical environment, within which such a system may operate and/or which may comprise part of such a system, will briefly be described.

Shown is an example seller system 106, an example buyer system 104, an example service provider system 134, an example licensing regulation authority system 124, an example registration regulation authority system 120 and an example service provider system 134. As used herein, a seller may be one or more of a seller, manufacturer, retailer, re-seller, distributor, producer or provider of goods and/or services, and a buyer may be a purchaser, consumer, end user, or receiver of goods and/or services from a buyer. The seller system 106 may be a computerized system of a seller of goods and/or services and the buyer system 104 may be a computerized system of a buyer of goods and/or services. Although only one example buyer system 104 and seller system 106 are shown, in various embodiments, there are multiple buyers and sellers and respective computerized systems associated with each buyer and seller. In the example shown, the seller associated with the seller system 106 may provide goods and/or services to the buyer associated with the buyer system 104. Such transactions between the seller system 106 and the buyer system 104 and associated prices and taxes may be calculated, processed, executed, analyzed, tracked, stored, audited and/or otherwise facilitated by the service provider system 134. Such transactions and/or potential transactions may be automatically stored by the seller system 106, buyer system 104 and/or service provider system 134 in transaction database 132. The service provider system 134 may provide such services in an automated manner on behalf of the buyer system 104, the seller system 106, the licensing regulation authority system 124, the registration regulation authority system 120 and/or any other system shown in FIG. 1, and may communicate over communication system 108 with various respective clients of such systems and/or via application programming interfaces (APIs) of such systems to provide services. In various embodiments, the service provider system 134 is, comprises part of, is integrated with and/or interacts with an existing ERP system used or implemented by one or more of the systems shown in FIG. 1.

In an example embodiment, the service provider system 134 enables and/or performs automated compliance verifications for the buyer system 104 against registration and licensing requirements published over the communication system 108 by the licensing regulation authority system 124 and registration regulation authority system 120. This is such that sellers can determine whether they can sell to a given destination and which goods and services they can sell to that destination. In one embodiment, the licensing regulation authority system 124 publishes regulatory and licensing requirements by communicating and storing such licensing rules in a licensing rules database 112 and maintaining the licensing rules database 112 by updating the licensing rules database 112 as changes occur to the regulations. The licensing regulation authority system 124 may also maintain a licensing forms database 110 with current electronic licensing forms that are automatically served up to be automatically populated by the buyer system 104, seller system 106, service provider system 134 and/or licensing interface system 128. Furthermore, the licensing regulation authority system 124 may maintain a license database 122 of current licenses of sellers, buyers products and/or services, and associated data identifying such parties and the licenses.

The registration regulation authority system 120 may publish regulatory and licensing requirements by communicating and storing such registration rules in a registration rules database 114 and maintaining the registration rules database 114 by updating the registration rules database 114 as changes occur to the regulations. The registration regulation authority system 120 may also maintain a registration forms database 116 with current electronic registration forms that may be automatically served up to be automatically populated by the buyer system 104, seller system 106, service provider system 134 and/or registration interface system 126. The licensing regulation authority system 124 may additionally maintain a license database 122 of current licenses of sellers, buyers products and/or services, and associated data identifying such parties and the licenses.

The service provider system 134, licensing interface system 128 and/or registration interface system 126 may integrate, or extract, information from systems that originate and/or store information pertaining to transactions, goods, services, and/or regulations across a variety of industries, such as seller system 106, buyer system 104, transaction database 132, licensing regulation authority system 124, license database 122, registration regulation authority system 120, registration database 118, registration forms database 116, registration rules database 114, licensing rules database 112 and licensing forms database 110. In one example embodiment, the service provider system 134 identifies the goods or services contained within a potential transaction, such as a potential transaction stored in transaction database 132, and queries a database of licenses, registrations and product registrations (also known as brand registrations, label registrations, or brand label registrations) in license database 122 and/or registration database 118 to validate that the proper documentation for the transaction exists. If the proper documentation does not exist, internal parties, or applications, such as those of seller system 106, buyer system 104, licensing interface system 128 and/or registration interface system 126, are automatically notified and the licensing interface system 128 and/or registration interface system 126 automatically initiates the application and/or renewal process for said goods or services for all applicable taxing and regulatory authorities, which may include licensing regulation authority system 124 and/or registration regulation authority system 120.

In conjunction with the automated license/registration verifications, a triple entry ledger system 130 improves automated computerized systems that facilitate transactions by enabling such systems to more efficiently ensure that all parties are acting in compliance without penalizing one side or another.

The entities and associated systems of FIG. 1 may communicate via physical and logical channels of communication system 108. For example, various information of the system 102 may be communicated between the entities and associated systems of FIG. 1 as data using the Internet Protocol (IP) suite over a packet-switched network such as the Internet or other packet-switched network, which may be included as part of communication system 108. Communication system 108 may include many different types of computer networks and communication media including those utilized by various different physical and logical channels of communication, now known or later developed. Non-limiting media and communication channel examples include one or more, or any operable combination of: fiber optic systems, satellite systems, cable systems, microwave systems, asynchronous transfer mode ("ATM") systems, frame relay systems, digital subscriber line ("DSL") systems, radio frequency ("RF") systems, telephone systems, cellular systems, other wireless systems, and the Internet. In various embodiments, communication system 108 can be or include any type of network, such as a local area network (LAN), a metropolitan area network (MAN), a wide area network (WAN), or the internet.

In some embodiments, communication system 108 utilizes, or is part of, "the cloud". In various embodiments, any of the systems of FIG. 1 may be within the communication system 108, located on "the cloud." In some embodiments, service provider system 134 implements a software service platform and hosts transaction database 132 and/or one or more other databases shown in FIG. 1 storing data. In some embodiments, the service provider system 134 implements the software service platform on the cloud, on the premises of a provider, in a combination of the two, or through other means for implementing a software service. In some embodiments, a single service of service provider system 134 uses additional server computers, for example in a peer-to-peer configuration, with the operations of the service distributed among them. The additional server computers can be located at a single geographic location or be distributed across multiple locations. Similarly, in some embodiments, additional databases may be used for the service, and so on.

Service provider system 134 may implement a service engine that performs a predefined service. The service can be a computation, a search, a verification, a registration, a generation of electronic documents, a payment, a notification, or other generation of specialized information that could not be performed by pen and paper and so on. For example, according to various embodiments of the present disclosure, the service may include electronically obtaining data regarding a potential transaction; based on the data regarding the potential transaction, automatically looking up one or more certain conditions that must be met for the transaction to proceed; automatically determining whether or not a particular one of the one or more certain conditions is met; and in response to a determination that the particular condition is not met: electronically identifying actions to be taken that will result in the particular condition being met for the potential transaction to proceed; and electronically initiating the identified actions. Such actions may include automatically generating and transmitting the electronic license or registration application documents and enabling licensing and product registration to be "auto-approved" by the service provider system 134 based on selectable setting of a user.

In the context of FIG. 1, in one embodiment, a user associated with seller system 106 desires the service provided by service provider system 134, and may even pay for it. Seller system 106 accesses communication system 108 and accesses the service provider system 134 through the communication system 108. It will be appreciated that, in some contexts, service provider system 134 performs cloud computing and is provided as software as a service (SaaS). Moreover, the service provider system 134 can view any system of FIG. 1 as a client system to which services are provided.

In various embodiments, systems in FIG. 1 may be integrated as part of other systems of FIG. 1. For example, the licensing interface system 128 and/or the registration interface system 126 may be integrated as part of the service provider system 134, run on the same processor as the service provider system 134 and/or be hosted by the service provider system 134. As another example, the transaction database 132 may be integrated as part of the service provider system 134, run on the same processor as the service provider system 134 and/or be hosted by the service provider system 134. In some embodiments, some or all of the functionality of the service provider system 134 may instead be implemented as a client or application of the buyer system 104 that communicates directly with the other systems in FIG. 1.

Computer program code for carrying out operations for aspects of the present disclosure may be written in any combination of one or more programming languages, including an object-oriented programming language such as Java, Smalltalk or the like, and/or conventional procedural programming languages, such as the "C" programming language or similar programming languages such as C++, C sharp, etc. Portions of the program code may be executed on buyer system 104, seller system 106, service provider system 134, licensing interface system 128, registration interface system 126, and so on.

Figure 2:
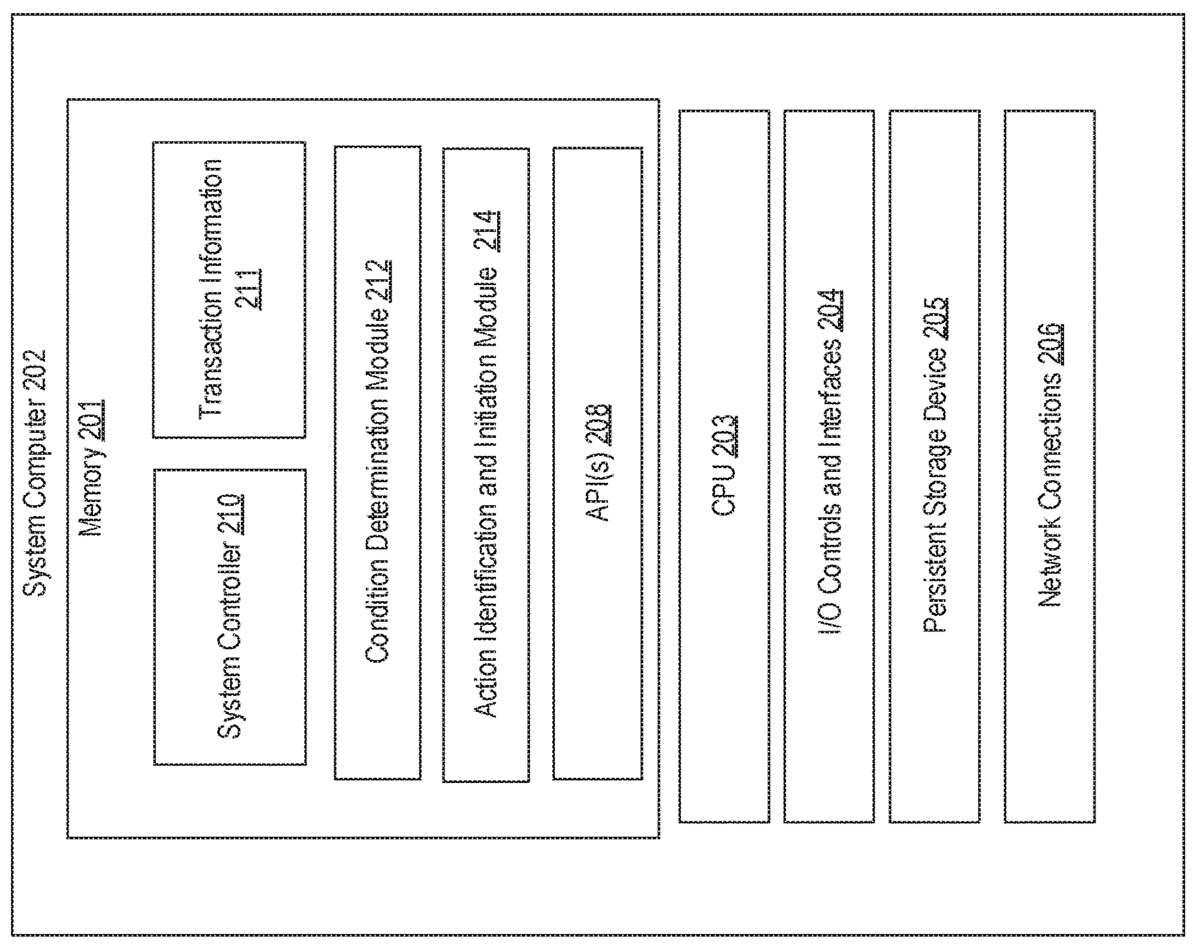
FIG. 2 is a block diagram illustrating elements of an example system computer that may be used in various systems of the present disclosure and that is an improvement in automated computerized systems, according to various embodiments of the present disclosure.

FIG. 2 is a block diagram illustrating elements of an example system computer 202 that may be used in the various systems of FIG. 1 and is an improvement in automated computerized systems, according to various embodiments of the present disclosure. For example, as shown, the system computer 202 may be used in buyer system 104, seller system 106, service provider system 134, licensing interface system 128 and/or registration interface system 126.

Example components are shown of the system computer 202 that may be incorporated in a specialized device (e.g., a server device, client device, or other specialized computing device) on which the systems and methods described herein may operate or be implemented, according to various embodiments described herein. The system computer 202 includes one or more of the following: a computer memory 201 for storing programs and data while they are being used, including programs and associated data implementing and/or comprising the systems described herein, an operating system including a kernel, and device drivers; a central processing unit ("CPU") 203 for executing computer programs (including computer-executable instructions); a persistent storage device 205, such as a hard drive or flash drive for persistently storing programs and data; and network connections 206 for connecting to one or more devices and/or other computer systems via communication system 108 of FIG. 1. Network connections 206 may send and/or receive data, such as via the Internet (or another network) and using associated networking hardware, such as switches, routers, repeaters, electrical cables and optical fibers, light emitters and receivers, radio transmitters and receivers, and the like. Also included are input/output "I/O" controls 204, including, but not limited to: buttons, virtual buttons, switches, keypads, keyboards, touchpads, touchscreens, display screens, liquid crystal displays, speakers, scroll wheel inputs, optical sensors, gesture sensors, accelerometers, motion control sensors, voice command sensors, microphones, trackballs and/or joysticks, etc. For example, the I/O controls 204 may include various different numbers and configurations of controls in various embodiments, including those with touch screen buttons and other input controls. The CPU 203 may be communicatively coupled to the memory 201, the I/O controls 204, persistent storage device 205 and network connections 206, (e.g., via a communications bus) in a manner to control one or more operations of those various components.

While a system computer 202 configured as described herein is typically used to support the operation of the systems described herein, the system 102 may be implemented using devices of various types and configurations and having various components which, when configured to perform the operations and processes described herein, are specialized non-generic devices. The memory 201 may include a system controller 210 which comprises and/or executes computer-executable instructions that, when executed by the CPU 203, cause the system computer 202 to perform the operations and functions described herein. For example, the applications, services, modules and other programs referenced herein, which may be stored in computer memory 201, may include or be comprised of such computer-executable instructions.

In the present example embodiment, the system computer 202 may be that of the service provider system 134, the licensing interface system 128 and/or the registration interface system 126. For example, the memory 201 may include a condition determination module 212 that electronically obtains data regarding a potential transaction (e.g., from transaction database 132); stores some or all of that information in memory 201 as transaction information 211; and based on the data regarding the potential transaction, automatically looks up one or more certain conditions that must be met for the transaction to proceed (e.g., via the licensing regulation authority system 124, license database 122, registration regulation authority system 120, registration database 118, registration forms database 116, registration rules database 114, licensing rules database 112, and/or licensing forms database 110). The condition determination module 212 may then automatically determine whether or not a particular one of the one or more certain conditions is met.

The memory 201 may include an action identification and initiation module 214 that, in response to a determination that the particular condition is not met: electronically identifies actions to be taken that will result in the particular condition being met (e.g., an applicable license or registration application document being generated and transmitted to the respective licensing regulation authority system 124 or registration regulation authority system 120) and electronically initiates the identified actions. Such actions may include automatically generating and transmitting the electronic license or registration application document and enabling licensing and product registration to be "auto-approved" by the system 102.

APIs of the system computer 202 may be used to invoke functionality or services of other systems to obtain and or send information in an automated manner. For example, the system computer 202 may communicate via network connections 206 over communication system 108 with various respective clients of such systems and/or use API(s) 208 via network connections 206 to provide or receive information and services. In some embodiments, after the condition determination module 212 electronically identifies actions to be taken that will result in the particular condition being met for the potential transaction to proceed, the condition determination module 212 initiates such actions by invoking the licensing interface system 128 and/or the registration interface system 126, via API(s) 208 to automatically generate and transmit the applicable electronic license or registration application document and enabling licensing and product registration to be "auto-approved" by the system controller 210 and/or a respective one of the licensing interface system 128 and registration interface system 126. In various embodiments, the service system computer 202 is, comprises part of, is integrated with and/or interacts with an existing ERP system used or implemented by one or more of the systems shown in FIG. 1.

Additional details about the components of FIG. 2 are provided near the end of this description, in order to avoid interrupting the flow of this description at this stage.

Figure 3A:
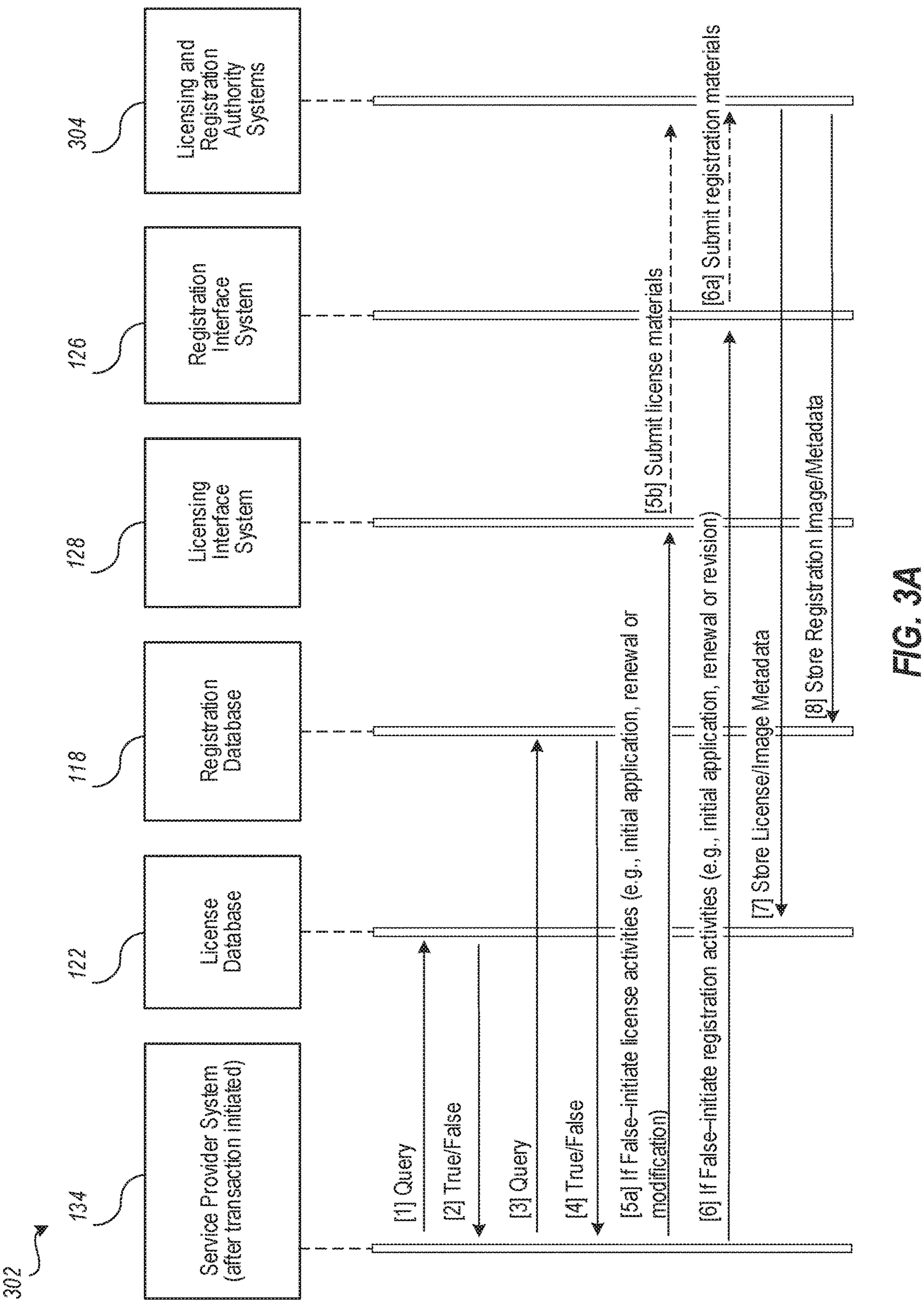
FIG. 3A is a sequence diagram showing license and registration verification stages that illustrates an improvement in automated computerized systems, according to various embodiments of the present disclosure.

FIG. 3A is a sequence diagram 302 showing license and registration verification stages that illustrates an improvement in automated computerized systems, according to various embodiments of the present disclosure. FIG. 3A illustrates the sequence in which licenses and registrations may be automatically verified, and whether a new application or renewal must be initiated in order to render the target transaction compliant.

In one embodiment, a transaction may be initiated by the seller system 106 and/or buyer system 104 of FIG. 1. An integrated system, which may include the service provider system 134 in communication with the seller system 106 and/or the buyer system, passes transaction information which may include, but is not limited to, parameters such as product/service type, quantity (ies), price(s), origin(s) of products and/or services, destination of products and/or services, buyer and seller information, information on the ownership structure of the seller and/or buyer businesses, identifiers of products, labels, marks and/or services generated by regulation authority systems, applicable exemption information, brand, trademark, service mark, appellation, vintage, bottle size, and fanciful name, etc. In various embodiments, the transaction information may include, but is not limited to, one or more of: data regarding one or more of: product type of a product involved in the potential transaction; service type of a service involved in the potential transaction; price of a service or product involved in the potential transaction; quantity of a service or product involved in the potential transaction; origin of a service or product involved in the potential transaction; destination of a service or product involved in the potential transaction; information regarding a seller of a product or service involved in the potential transaction; information regarding a buyer of a product or service involved in the potential transaction; exemption information regarding product or service involved in the potential transaction; exemption information regarding a type, price or quantity of a product or service involved in the potential transaction; exemption information regarding a buyer or seller involved in the potential transaction; exemption information regarding an origin of a service or product involved in the potential transaction; exemption information regarding a destination of a service or product involved in the potential transaction; identifiers of products, labels, marks and/or services generated by regulation authority systems; brand; trademark; service mark; appellation; vintage; bottle size; and fanciful name, etc. In some embodiments, such information may be stored and accessible in the transaction database 132.

After or in response to a transaction being initiated (e.g., as indicated by the seller system 106, the buyer system 104 and/or information appearing in the transaction database 132 of FIG. 1) and based on the type of good or service being sold, the origin and destination information provided in the transaction and the current information regarding the seller (e.g., ownership structure, new officers, new address, etc.), the service provider system 134 queries the license database 122 to verify that the proper license(s) are in place, are not expired and include current and valid information for the transaction to be processed.

If the proper license(s) exist, are not expired and include current and valid information the license database 122 returns a "true" value back to the transaction being processed by the service provider system 134. In one example embodiment, compliance consists of having the proper license(s) with taxing and regulatory authorities and having non-expired licenses with taxing and regulatory authorities. For example, the service provider system 134 may electronically determine a certain license document that, based on the data regarding the potential transaction, should have been stored in the license database 122. Then the service provider system 134 may verify with the license database 122 to determine whether or not the certain license document is indeed stored in the license database 122. In response to determining that the certain license document is indeed stored, the service provider system 134 may read an expiration date of the certain license document stored in the license database 122 and determine whether or not the expiration date has passed (i.e., to verify whether the license is currently active). Furthermore, if the license document itself is active and technically valid, the service provider system 134 may verify with the license database 122 whether the license needs to be modified due to a requirement for the licensee to update the license if certain things about the business have changed (new ownership structure, new officers, new address, etc.). In one example embodiment, this may be performed by the service provider system 134 validating, based on the transaction information, whether the ownership structure, officer structure, addresses or other information that could trigger a license modification requirement have changed since the last time a verification occurred. For example, the licensing rules database 112 of FIG. 1 may include a database of rules that determines or includes conditions when a license modification is required and the query to the license database 122 to determine whether such license information is current may be made according to such rules. If the seller does not have the proper license(s) in their origin or destination addresses, their license(s) are no longer valid, or their license(s) need modified, then the license verification will return a "false" message to the transaction being processed by the service provider system 134 indicating one or more reasons why the license verification failed.

This failure of the license verification with the license database 122 programmatically initiates the service provider system 134 to send a signal or applicable data to the licensing interface system 128 to cause the licensing interface system 128 to electronically initiate the applicable license activities to address the reason(s) for the verification failure. For example, the licensing interface system 128 may start the licensing process with applicable internal parties or applications; auto-generate the license application materials, including any required license application documents; renew an expired license; update or otherwise modify existing license documents as needed in real time; remit license application, renewal and/or modification fees due to the licensing and registration authority via the licensing and registration authority systems 304; and/or submit license materials including license renewal materials, modifications and/or the initial application materials as applicable, to the proper licensing and registration authority systems 304 (e.g., to the licensing regulation authority system 124 of FIG. 1) on behalf of the seller. In response to the applicable licensing and registration authority systems 304 approving the submitted license materials, the applicable licensing and registration authority systems 304 (in some embodiments via the service provider system 134) cause an image of the applicable license application and associated license metadata (e.g., seller information, product and/or service information, registration identifiers, information on the ownership structure of the seller and/or buyer businesses, identifiers of products, labels, label images, marks and/or services generated by regulation authority systems, and applicable exemption information, brand, trademark, service mark, appellation, vintage, bottle size, and fanciful name, etc.) to be stored in the license database 122.

Based on the type and characteristics of goods or services being sold, and the origin and destination parameters provided in the transaction, the service provider system 134 queries the registration database 118 to verify that the proper registration(s) are in place, are not expired and include current and valid information for each product identified in the transaction for the transaction to be processed. If the proper registrations exist, are not expired, the good/service type(s) are compliant with the origin and destination address' rules and regulations, and the registrations include current and valid information for each product identified in the transaction, the registration database returns a "true" value back to the transaction being processed by the service provider system 134. In one example embodiment, compliance consists of having the proper registration(s) with taxing and regulatory authorities, having non-expired registration(s) with taxing and regulatory authorities and having corresponding registrations that have current product or service information for each product identified in the transaction. For example, the service provider system 134 may electronically determine a certain registration document that, based on the data regarding the potential transaction, should have been stored in the registration database 118 for a particular product identified in the transaction. Then the service provider system 134 may verify with the registration database 118 to determine whether or not the certain registration document is indeed stored in the registration database 118. In response to determining that the certain registration document is indeed stored, the service provider system 134 may read an expiration date of the certain registration document stored in the registration database 118 and determine whether or not the expiration date has passed (i.e., to verify whether the registration is currently active). Furthermore, if the registration document itself is active and technically valid, the service provider system 134 may verify with the registration database 122 whether the registration needs revised due to a requirement for the seller to update the registration if certain things about the product(s) identified in the transaction have changed.

For example, the service provider system 134 may verify via the registration database 118 that the label associated with a product identified in the transaction is properly registered, but something is new with this particular product (e.g., a new bottle size (1.5 L instead of 750 ml), new Vintage (2018 instead of 2017), etc.) which results in the service provider system 134 determining a revision to the associated registration is required. In one example embodiment, this may be performed by the service provider system 134 determining, based on the transaction information for each product identified in the transaction, whether any relevant product characteristics such as brand, appellation, vintage, bottle size, fanciful name, or other information that could trigger a license modification requirement, have changed since the last time a verification occurred. For example, the registration rules database 114 of FIG. 1 may include a database of rules that determines or includes conditions when a registration revision is required and the query to the registration database 118 to determine whether such registration information is current may be made according to such rules. If the seller or producer does not have the proper registration(s) for their origin or destination addresses, their registration(s) are no longer valid, or the registration(s) need revised, then the registration verification will return a "false" message back to the transaction being processed by the service provider system 134 indicating one or more reasons why the registration verification failed.

This failure of the registration verification with the registration database 118 programmatically initiates the service provider system 134 to send a signal or applicable data to the registration interface system 126 to cause the registration interface system 126 to electronically initiate the applicable registration activities to address the reason(s) for the verification failure. For example, the licensing interface system 128 may start the registration process with applicable internal parties or applications; auto-generate the registration application materials, including any required registration application documents; renew an expired registration; revise existing registration documents as needed in real time; remit registration application, renewal and/or modification fees due to the licensing and registration authority via the licensing and registration authority systems 304; and/or submit registration materials including registration renewal materials, revisions and/or the initial application materials as applicable to the proper licensing and registration authority systems 304 (e.g., to the registration regulation authority system 120 of FIG. 1) on behalf of the seller. In response to the applicable licensing and registration authority systems 304 approving the submitted registration materials, the applicable licensing and registration authority systems 304 (in some embodiments via the service provider system 134) cause an image of the applicable registration application and associated registration metadata (e.g., seller information, product and/or service information, registration identifiers, information on the ownership structure of the seller and/or buyer businesses, identifiers of products, labels, label images, marks and/or services generated by regulation authority systems, applicable exemption information, brand, trademark, service mark, appellation, vintage, bottle size, and fanciful name, etc.) to be stored in the registration database 118. For example, label images may be an actual digital image file such as a Joint Photographic Experts Group (JPEG), Graphic Interchange Format (GIF), or Portable Network Graphic (PNG) image file, etc.

Figure 3B:
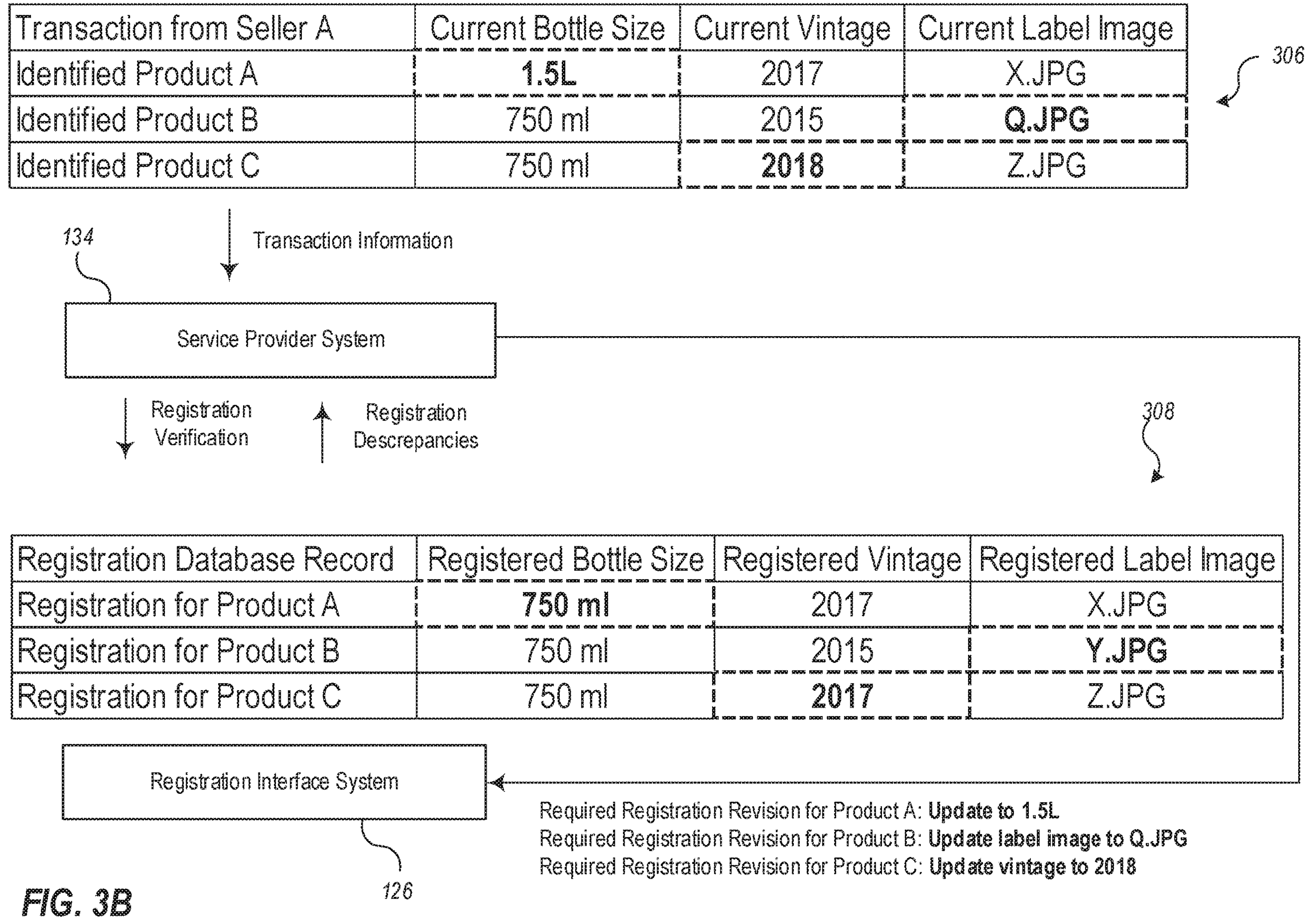
FIG. 3B is a block diagram showing how revisions to existing registrations for products identified in a transaction may be determined, according to various embodiments of the present disclosure.

FIG. 3B is a block diagram showing how revisions to existing registrations for products identified in a transaction 306 may be determined, according to various embodiments of the present disclosure. As described above with respect to FIG. 3A, in one example embodiment, compliance consists of having the proper registration(s) with taxing and regulatory authorities, having non-expired registration(s) with taxing and regulatory authorities and having corresponding registrations that have current product or service information for each product identified in the transaction. FIG. 3B illustrates an example of how the service provider system may verify that corresponding registrations that have current product or service information for each product identified in the transaction and identify any registration revisions that are required. In one embodiment, if the registration document itself is active and technically valid, the service provider system 134 may verify with an applicable registration database record 308 of the registration database 122 whether the registration needs revised due to a requirement for the seller to update the registration if certain things about the product(s) identified in the transaction have changed.

In the example shown in FIG. 3B, the service provider system 134 obtains transaction information for a transaction 306 and identifies particular products in the transaction. In the present example, the products identified are alcoholic beverages for which brand label registrations are required. For each product identified in the transaction 306 (e.g., Product A, Product B and Product C), the service provider system 134 verifies with the applicable registration database record 308 of the identified seller associated with the transaction 306 whether the corresponding registration(s) for those products include current information regarding applicable product characteristics for each of the products identified in the transaction 306. For example, the current product information may be identified from the transaction information or other information associated with the seller. As shown in FIG. 3B, the registration verification reveals that the registration for Product A needs to be revised to reflect the current bottle size of 1.5 L as a result of an identified discrepancy with the bottle size in the registration database record 308 indicated as 750 ml. The registration verification also reveals that the registration for Product B needs to be revised to reflect the current vintage of 2018 as a result of an identified discrepancy with the vintage in the registration database record 308 indicated as 2017. Furthermore, the registration verification reveals that the registration for Product C needs to be revised to reflect the current label image (included in an image file named Q.JPG) as a result of an identified discrepancy with the label image in the registration database record 308 (included in an image file named Y.JPG). In one embodiment, the indications of such revisions may be communicated from the service provider system 134 to the registration interface system 126, which may then automatically initiate and/or perform the registration revisions and associated fee remittances accordingly with the applicable registration regulation authority system 120 in real time.

Figure 4A:
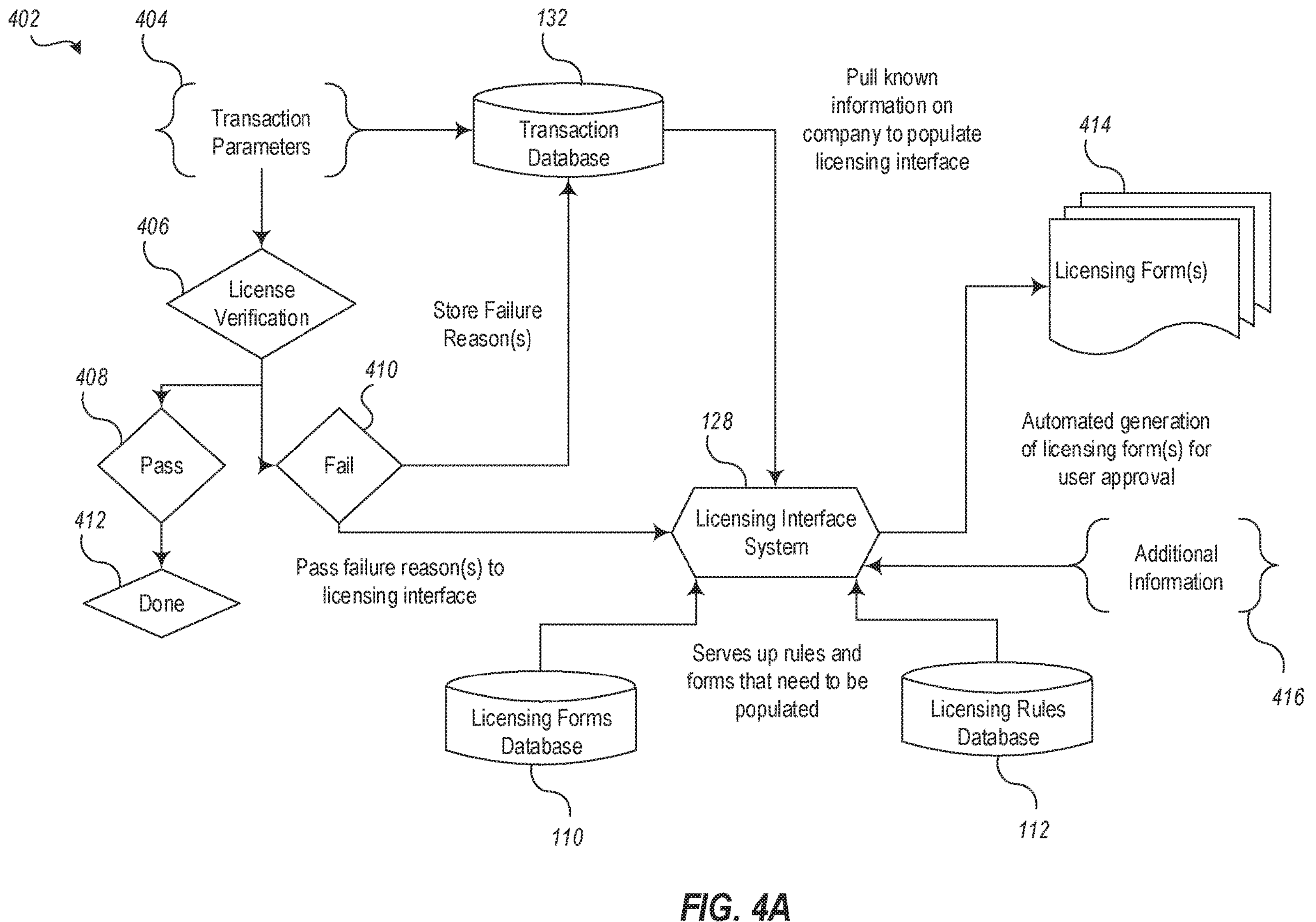
FIG. 4A is a block diagram illustrating a technological system and process involving an automated digital licensing interface system that is an improvement in automated computerized systems, according to various embodiments of the present disclosure.

FIG. 4A is a block diagram illustrating a technological system and process 402 involving the automated digital licensing interface system 128 that is an improvement in automated computerized systems, according to various embodiments of the present disclosure. Shown in FIG. 4A is a process 402 of extracting existing system information, such as transaction parameters 404, from the system via the service provider system 134 of FIG. 1 and aggregating it with additional information 416 provided by the user through a wizard interface, such as the licensing interface system 128. This is to automatically generate licensing form(s) 414 for user and/or system approval and/or submission to the licensing regulation authority system 124 of FIG. 1. In various embodiments, the additional information includes one or more of: documents regarding the potential transaction, documents regarding one or more parties involved in the potential transaction, business information regarding a business involved in the potential transaction, personal information regarding one or more parties involved in the potential transaction, fulfillment operations information, information regarding an origin or destination of a product or service involved in the potential transaction, and information regarding a product or service involved in the potential transaction.

After a transaction is initiated, transaction information including transaction parameters 404 are used to perform the license verification 406. These transaction parameters 404 are also communicated to and stored in a transaction database 132. In one embodiment, when potential transaction(s) occur, or are about to occur, and the license verification 406 with the license database 122 of FIG. 1 fails 410 because the seller does not have adequate license(s) for the origin and/or destination of the goods and/or services being provided, or the license(s) do not include current and valid information (e.g., regarding the business of a seller associated with the transaction), the licensing interface system 128 will initiate the modification of existing license documents and/or creation of licensing applications of all applicable license types for all applicable jurisdictions or other domains and automatically generate and populate the applicable licensing form(s) 414 for user approval. For example, the applicable licensing form(s) 414 may include electronic application documents for new licenses and/or documents to modify or otherwise update existing license documents. This modification of existing license documents and/or creation of licensing applications of all applicable license types is based on the applicable rules for that transaction served by the licensing rules database 112 and is also based on the identified licensing forms that need to be populated, which are served by the licensing forms database 110. If the license verification 406 passes 408, then no further action is required to obtain the applicable license(s) and the process is done 412.

The licensing interface system 128 pulls known information regarding the party or parties (e.g., companies) and goods or services involved in the transaction from the transaction parameters 404 stored in the transaction database 132 and also receives the reasons the licensing verification failed from the license verification 406. Based on the reasons the licensing verification failed and the information regarding the party or parties and goods or services involved in the transaction, the licensing interface system 128 determines which license type(s) are missing, expired or include information that requires modification and will identify the appropriate actions required to complete a license application and/or modify the existing license document for the transaction to proceed. For example, these actions may include the user supplying additional information 416, such as, for example, compliance documents, business and/or personal information, fulfillment operations information, product information and/or service information. In some instances, this may require the user's (e.g., the seller's) physical presence at a taxing or licensing authority. If such physical presence is required, the licensing interface system 128 will indicate such requirements to one or more users and, in some embodiments, may schedule an appointment for the user at the applicable taxing or licensing authority and automatically communicate that appointment to the user via the licensing interface system 128. The licensing interface system 128 then merges existing system information, such as transaction parameters 404, with supplementary information provided by the user, such as additional information 416, to create electronic license application(s) and/or documents to modify or otherwise update existing license documents, which may include licensing form(s) 414.

These licensing application documents and/or documents to modify or otherwise update existing license documents may then be mailed or transmitted electronically by the licensing interface system 128 to the proper licensing and registration authority systems 304 (e.g., to the licensing regulation authority system 124 of FIG. 1) on behalf of the party involved the transaction (e.g., the seller). In other embodiments, however, these can be mailed or transmitted to the party by the licensing interface system 128, which in turn can transmit or file them with the proper taxing/regulatory system, such as the licensing regulation authority system 124 of FIG. 1. Furthermore, the appropriate application fees are paid to all applicable jurisdiction(s) or other domains by the licensing interface system 128 using electronic or physical payment methods. For example, the electronic payment may be automatically made to the licensing regulation authority system 124 of FIG. 1.

In scenarios where authorities provide electronic access to licensing status, the automated license application will communicate the stage and status of the license application(s) to the end user via a web-based user interface. In some embodiments, this web-based user interface may be part of or integrated with the licensing interface system 128.

In embodiments where the license verification 406 indicates a license renewal is required (e.g., because the license verification failed due to an expired license), the licensing interface system 128 may auto-generate license renewal documents, which may comprise or be part of licensing form(s) 414, based on information previously provided by the licensing application system, such as information provided from license database 122 of FIG. 1 and/or the transaction parameters 404. The licensing interface system 128 may present the auto-generated document for final approval to a user prior to transmission to the appropriate taxing/regulatory authority system, such as the licensing regulation authority system 124 of FIG. 1. At this point, the licensing regulation authority system 124 of FIG. 1 has an option of marking the transaction as "compliant" by implementing the digital signature/hashing methods described in further detail herein.

When a new license application, a license renewal, or a license modification/revision needs to be filed, transmitted or otherwise submitted to the appropriate taxing/regulatory authority system, such as the license regulation authority system 124 of FIG. 1, payment or remittance may also be initiated or made to the appropriate taxing/regulatory authority system via the licensing interface system 128. Payment may be made in conjunction with electronically filing, transmitting or otherwise submitting a form or a return, such as licensing form(s) 414, with the appropriate taxing/regulatory authority system. The licensing interface system 128 may determine the correct amount of payment or remittance by consulting the licensing rules database 112, which may store the current fees due in various circumstances. In some embodiments, the licensing interface system 128 automatically remits or initiates remittance of these fees to the appropriate taxing/regulatory authority system(s), as a default. In other embodiments, the licensing interface system 128 consults settings made by a client, such as the seller system 104, and remits these fees when the client has instructed that by their settings.

Figure 4B:
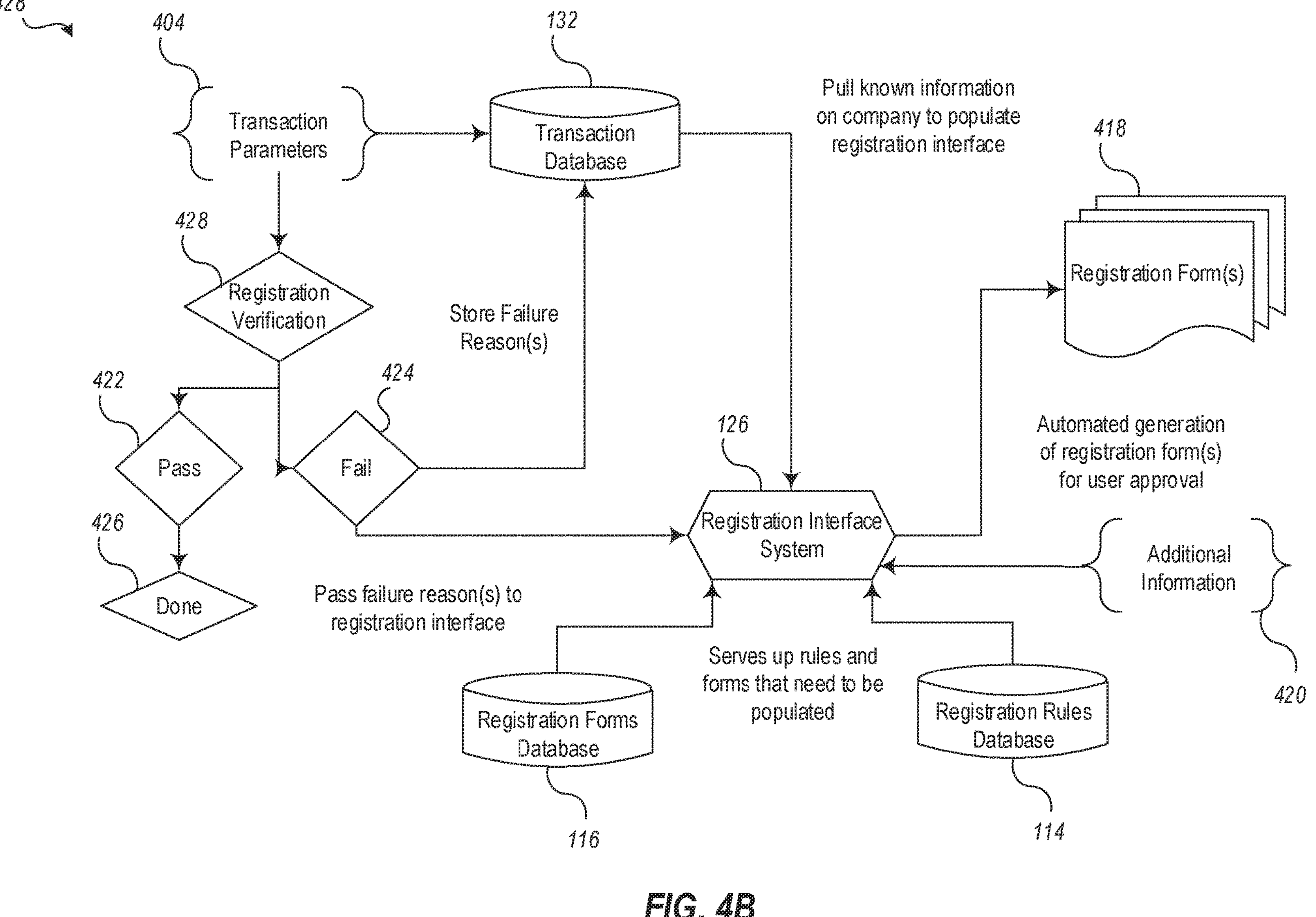
FIG. 4B is a block diagram illustrating a technological system and process involving an automated digital registration interface system that is an improvement in automated computerized systems, according to various embodiments of the present disclosure.

FIG. 4B is a block diagram illustrating a technological system and process 428 involving an automated digital registration interface system 126 that is an improvement in automated computerized systems, according to various embodiments of the present disclosure. Shown in FIG. 4B is a process 428 of extracting existing system information, such as transaction parameters 404, from the system via the service provider system 134 of FIG. 1 and aggregating it with additional information 420 provided by the user through a wizard interface, such as registration interface system 126. This is to automatically generate registration form(s) 418 for user and/or system approval and/or submission to the registration regulation authority system 120 of FIG. 1. The additional information 420 may include information such as that of additional information 416 of FIG. 4A, but specifically applicable to registration compliance and completion of the registration form(s) 418.

After a transaction is initiated, transaction information including transaction parameters 404 are used to perform the registration verification 428. These transaction parameters 404 are also communicated to and stored in a transaction database 132. In one embodiment, when potential transaction(s) occur, or are about to occur, and the registration verification 428 with the registration database 118 of FIG. 1 fails 424 because the seller does not have adequate registrations for the origin and/or destination of the goods and/or services being provided, or the existing registration(s) do not include current and valid information (e.g., regarding products or services identified in the transaction), the registration interface system 126 will initiate the revision of existing registration documents and/or creation of registration applications for all applicable registration types for all applicable jurisdictions or other domains and automatically generate and populate the applicable registration form(s) 418 for user approval. For example, the applicable registration form(s) 418 may include electronic application documents for new registrations and/or documents to revise or otherwise update existing registration documents for particular products or services identified in a transaction. This revision of existing registration documents and/or creation of registration applications for all applicable registration types is based on the applicable rules for the transaction, which are served by the registration rules database 114, and is also based on the identified registration forms that need to be populated, which are served by the registration forms database 116. If the registration verification 428 passes 422, then no further action is required to obtain the applicable registration(s) and the process is done 426.

The registration interface system 126 pulls known information regarding the party or parties (e.g., companies) and goods or services involved in the transaction from the transaction parameters 404 stored in the transaction database 132 and also receives the reasons the registration verification failed from the registration verification 428. Based on the reasons the registration verification failed and the information regarding the party or parties and goods or services involved in the transaction, the registration interface system 126 determines which registration type(s) are missing, expired, or include information that requires revision and will identify the appropriate actions required to complete a registration application and/or revise the existing registration document for the transaction to proceed. For example, this may include the user supplying additional information 420, such as, for example, compliance documents, business and/or personal information, fulfillment operations information, product information and/or service information. In some instances, this may require the user's (e.g., the seller's) physical presence at a taxing or registration authority. If such physical presence is required, the registration interface system 126 will indicate such requirements to one or more users and, in some embodiments, may schedule an appointment for the user at the applicable taxing or registration authority and automatically communicate that appointment to the user via the registration interface system 126. The registration interface system 126 then merges existing system information, such as transaction parameters 404, with supplementary information provided by the user, such as additional information 420, to create electronic registration application(s) and/or documents to revise or otherwise update existing registration documents, which may include registration form(s) 418.

These registration application documents and/or documents to revise or otherwise update existing registration documents may then be mailed or transmitted electronically by the registration interface system 126 to the proper taxing/regulatory systems (e.g., to the registration regulation authority system 120 of FIG. 1) on behalf of the party involved in the transaction (e.g., the seller). In other embodiments, however, these can be mailed or transmitted to the party by the registration interface system 126, which in turn can transmit or file them with the proper taxing or regulatory system, such as the registration regulation authority system 120 of FIG. 1. Furthermore, the appropriate application fees are paid to all applicable jurisdiction(s) or other domains by the registration interface system 126 using electronic or physical payment methods. For example, the electronic payment may be automatically made to the registration regulation authority system 120 of FIG. 1.

In scenarios where authorities provide electronic access to registration status, the automated registration application will communicate the stage and status of the registration application(s) to the end user via a web-based user interface. In some embodiments, this web-based user interface may be part of or integrated with the registration interface system 126.

In embodiments where the registration verification 428 indicates a registration renewal is required (e.g., because the registration verification failed due to an expired registration), the registration interface system 126 may auto-generate registration renewal documents, which may comprise or be part of registration form(s) 418, based on information previously provided by the registration application system, such as information provided from registration database 118 of FIG. 1 and/or the transaction parameters 404. The registration interface system 126 may present the auto-generated document for final approval to a user prior to transmission to the appropriate taxing/regulatory authority system, such as the registration regulation authority system 120 of FIG. 1. At this point, the registration regulation authority system 120 of FIG. 1 has an option of marking the transaction as "compliant" by implementing the digital signature/hashing methods described in further detail herein.

When a new registration application, a registration renewal, or a registration modification/revision needs to be filed, transmitted or otherwise submitted to the appropriate taxing/regulatory authority system, such as the registration regulation authority system 120 of FIG. 1, payment or remittance may also be initiated or made to the appropriate taxing/regulatory authority system via the registration interface system 126. Payment may be made in conjunction with electronically filing, transmitting or otherwise submitting a form or a return, such as registration form(s) 418, with the appropriate taxing/regulatory authority system. The registration interface system 126 may determine the correct amount of payment or remittance by consulting the registration rules database 114, which may store the current fees due in various circumstances. In some embodiments, the registration interface system 126 automatically remits or initiating remittance of these fees to the appropriate taxing/regulatory authority system(s), as a default. In other embodiments, the registration interface system 126 consults settings made by a client, such as the seller system 104, and remits these fees when the client has instructed that by their settings.

Also, in various embodiments, the functions of the licensing interface system 128 and/or the registration interface system 126 described herein may be performed and/or controlled by the service provider system 134.

Figure 5:
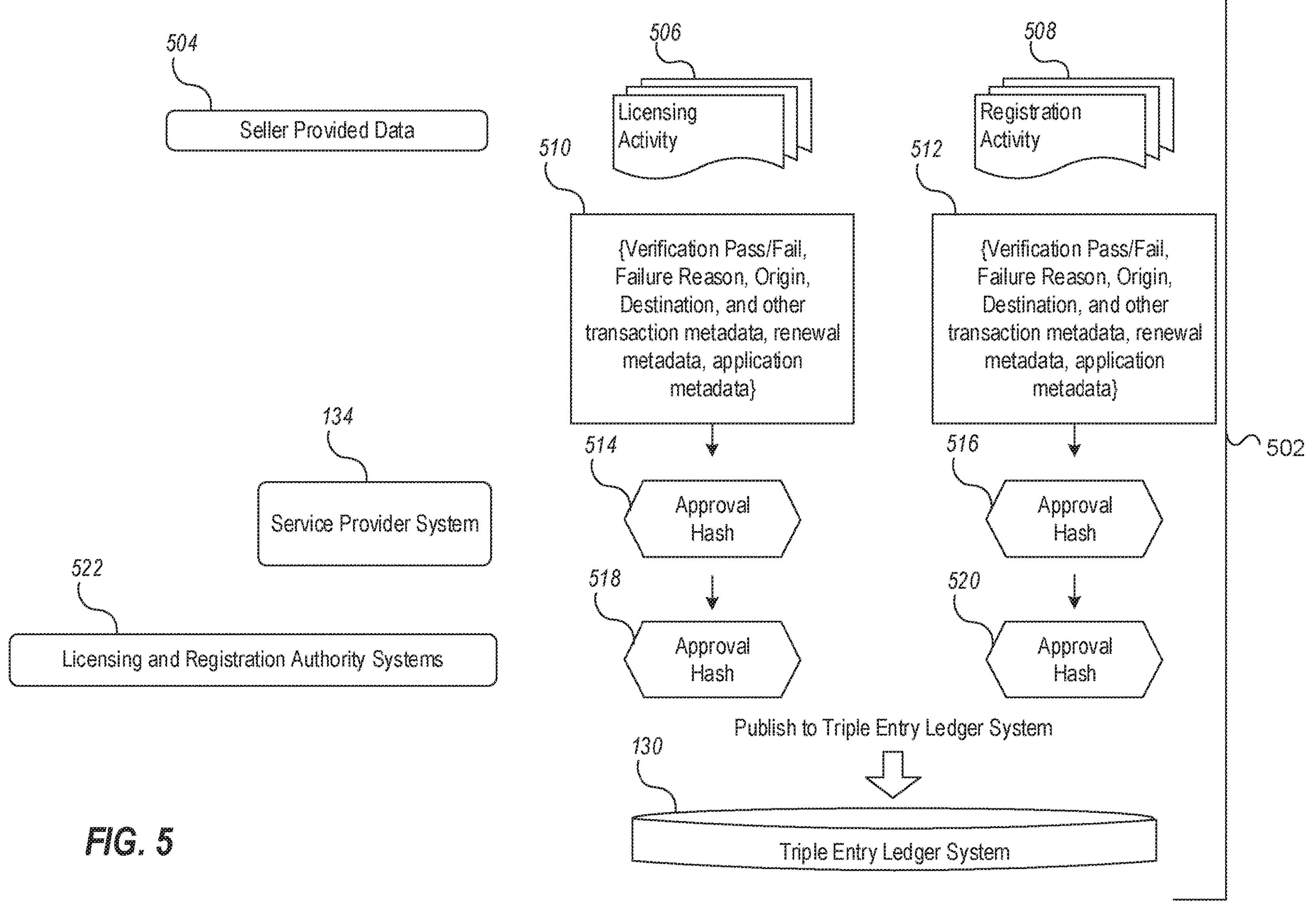
FIG. 5 is a block diagram illustrating a technological system and process implementing a digital hash/signature in a triple entry ledger system that is an improvement in automated computerized systems, according to various embodiments of the present disclosure.

FIG. 5 is a block diagram illustrating a technological system and process 502 implementing a digital hash/signature in a triple entry ledger system 130 that is an improvement in automated computerized systems, according to various embodiments of the present disclosure.

Throughout processes described herein using seller provided data 504 for automated license and registration applications and renewals, licensing activity data 510 is extracted from license activity 506 and registration activity data 512 is extracted from registration activity 508. This data may be recorded, and written, to a triple entry ledger system 130. This triple entry ledger system 130 may be accessed by licensing and registration authority systems 522, such as licensing regulation authority system 124 and registration regulation authority system 120, automated tax assistance service provider systems, such as service provider system 134 and systems of sellers and/or buyers of goods and/or services, such as buyer system 104 and seller system 106 of FIG. 1. The licensing activity data 510 that may be recorded on the triple entry ledger system 130 includes, but is not limited to: licensing verification activity; licensing verification failures and reasons, licensing application activity; licensing renewal activity; transaction origin information; transaction destination information; other transaction data;

and associated metadata regarding any such information. The registration activity data 512 that may be recorded on the triple entry ledger system 130 includes, but is not limited to: registration verification activity; registration verification failures and reasons, registration application activity; registration renewal activity; transaction origin information; transaction destination information; other transaction data; and associated metadata regarding any such information.

Each entry on the triple entry ledger system 130 will be associated with a unique hash, key, or equivalent technology, which is created by the system creating the entry (e.g., the seller system 106, the service provider system 134 or the applicable licensing and registration authority systems 522) and validated by all other parties on the triple entry ledger system 130. This enables real-time compliance and regulation between sellers and regulators, with an automated tax assistance service provider system, such as service provider system 134, serving as a trusted third party. The service provider system 134 may generate a unique approval hash 514 associated with a particular license application document including specific seller provided data 504 and specific licensing activity data 510 for the particular license application document. Then, the licensing regulation authority system 124 of the licensing and registration authority systems 522 may also generate a unique approval hash 518 associated with the particular license application document including the specific seller provided data 504 and specific licensing activity data 510 for the particular license application document. Both the unique approval hash 514 generated by the service provider system 134 and the unique approval hash 518 generated by the licensing regulation authority system 124 of the licensing and registration authority systems 522 may be recorded, and written, to a triple entry ledger system 130.

Furthermore, the service provider system 134 may generate a unique approval hash 516 associated with a particular registration application document including specific seller provided data 504 and specific registration activity data 512 for the particular registration application document. Then, the registration regulation authority system 120 of the licensing and registration authority systems 522 may also generate a unique approval hash 520 associated with the particular registration application document including the specific seller provided data 504 and specific registration activity data 512 for the registration application document. Both the unique approval hash 516 generated by the service provider system 134 and the unique approval hash 520 generated by the registration regulation authority system 120 of the licensing and registration authority systems 522 may be recorded, and written, to the triple entry ledger system 130.

The triple entry ledger system 130 may then be automatically accessed by various parties, including the buyer, seller and/or licensing and registration authority systems 522, for validation of licensing and/or registration verifications and potential transactions using the unique approval hashes recorded on the triple entry ledger system 130. License and registration verifications are currently performed manually by compliance analysts. Thus, advantages and additional benefits of the present disclosure include, among others, automated real-time enforcement of licensing and registration requirements from regulatory authorities and real-time compliance process for sellers/providers of goods/services.

Figure 6A:
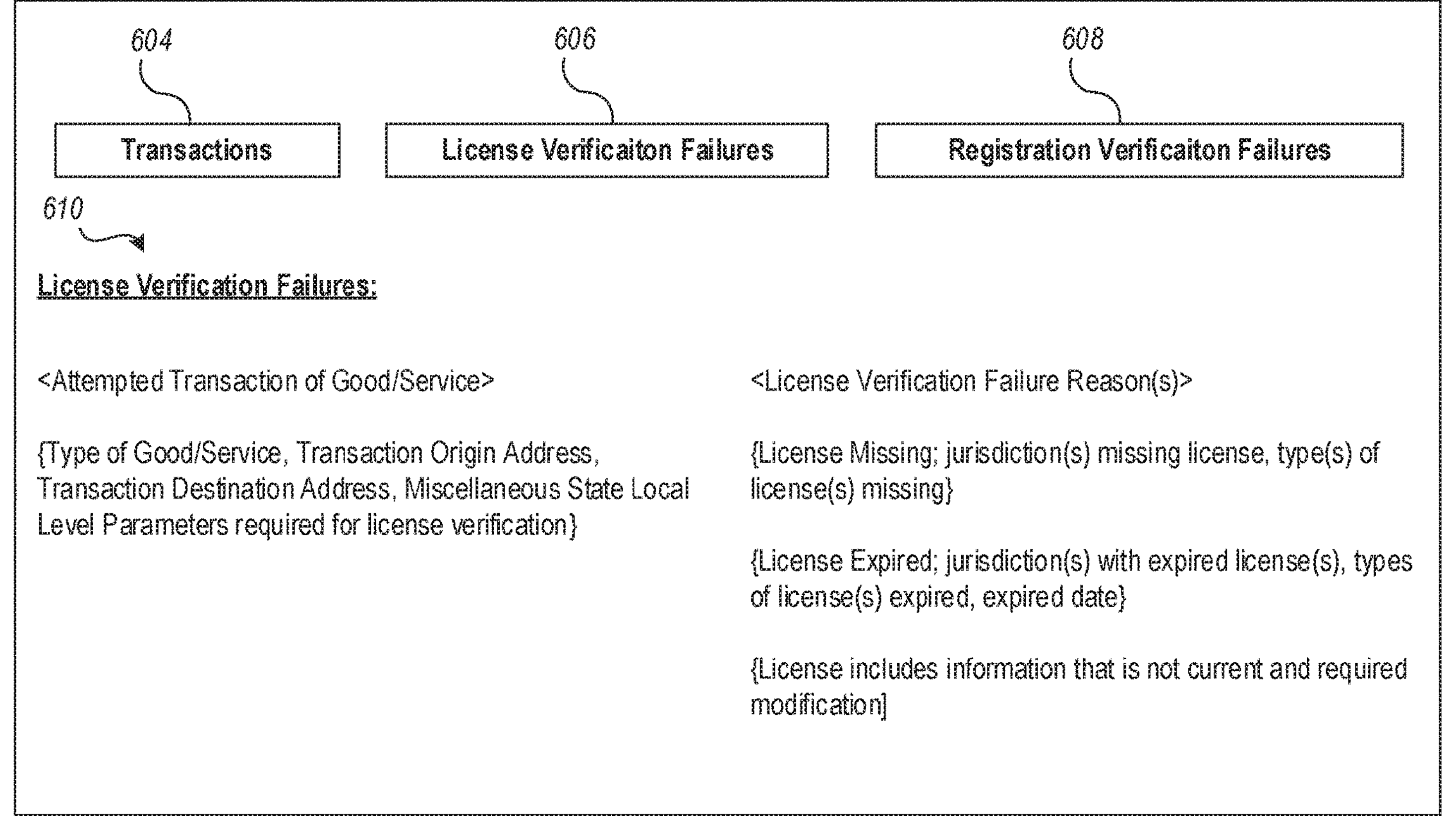
FIGS. 6A and 6B are illustrations of respective example interactive graphical user interfaces each showing a respective example registration/license verification failure interface that is an improvement in automated computerized systems, according to various embodiments of the present disclosure.
Figure 6B:
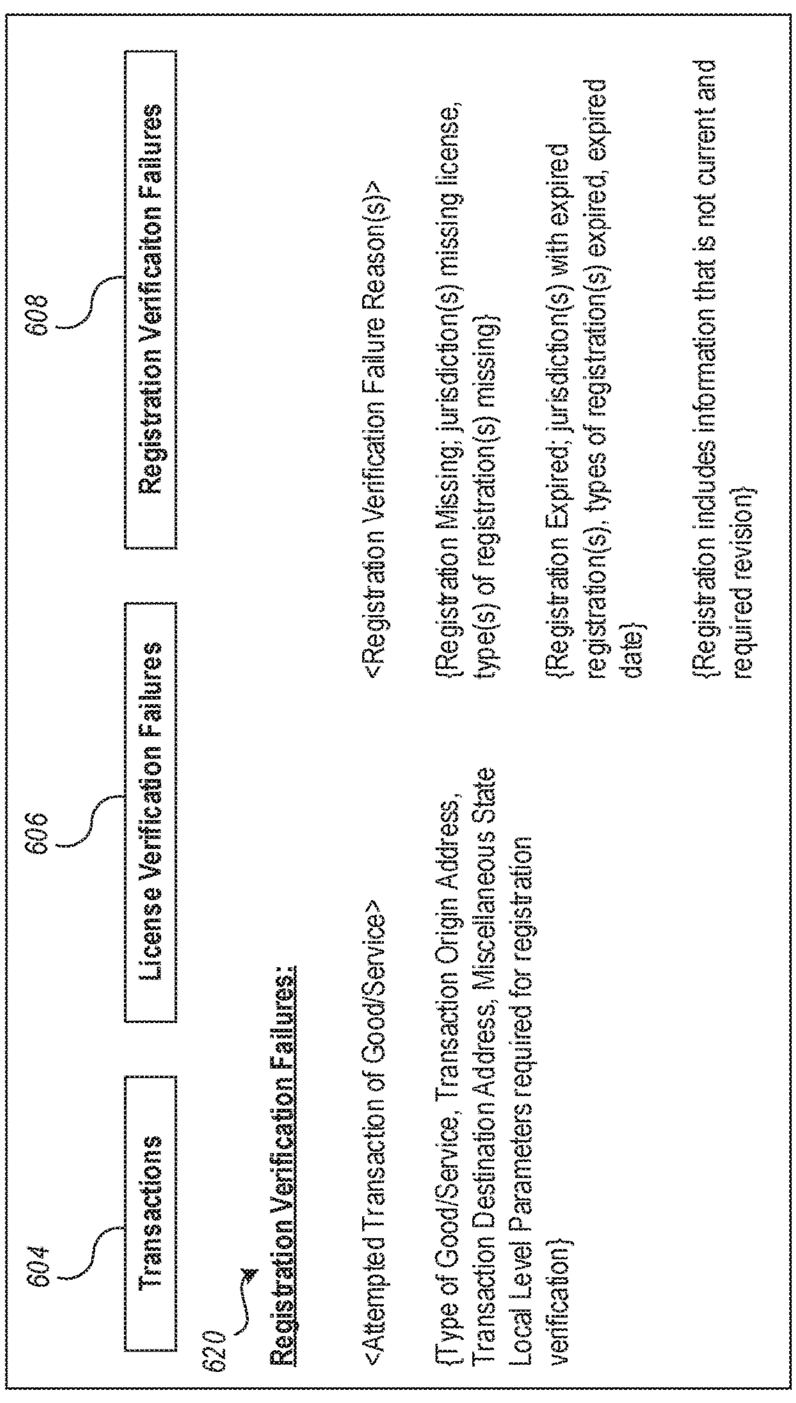

FIGS. 6A and 6B are illustrations of respective example interactive graphical user interfaces each showing a respective example registration/license verification failure interface that is an improvement in automated computerized systems, according to various embodiments of the present disclosure. In one embodiment, the example interactive graphical user interfaces of FIGS. 6A, 6B, 7 and 8 may be part of a client UI provided by the seller system 106, service provider system 134, licensing interface system 128, registration interface system 126, licensing regulation authority system 124 and/or registration regulation authority system 120 used by the seller to submit licensing and/or registration application(s) and also used by regulatory authorities to publish rules and forms which stipulate requirements for approval.

As one example scenario, a winery may need to perform a manual compliance verification to determine whether a case of wine can be shipped from California to South Dakota as part of a specific transaction. The compliance verification performed by the system 102 determines that the shipment is compliant with direct to consumer shipping laws and regulations. However, during such a compliance verification, it is discovered that the winery does not have an active current license or product registration in the state of South Dakota. Using data that already exists in the system 102, an application for licensing and product registration would be automatically generated ("auto-generated") by the system 102. In instances where the data has already been entered, and approved, by an administrative user, the new application(s) for licensing and product registration would be "auto-approved" by the user and submitted to the regulatory authority for approval. As indicated in FIGS. 4A and 4B, the regulatory authority publishes forms and rules for both licenses and registrations, which dictates the rules for "auto-approval". If all standards and business logic are satisfied, the applications are auto-approved and the winery can perform and ship the wine with zero lag due to approval time. Otherwise, the rejected application(s) will appear in the customer UI where they will have an opportunity to amend the application(s) and re-submit them. In one embodiment, in instances where new or other additional data is required, existing information will be used to pre-fill the application and the system 102 will require that an administrative user goes into the system 102 and satisfy missing data requirements, which will be merged with the existing information that is pre-filled in the application, and approve the application(s).

In an example embodiment, for a transaction to be fully compliant, it must satisfy both license and registration verifications for the related good and/or service type, origin, and destination. If one or more of these verifications fails, the good or service in question is not compliant with one or more regulations put forth by state or local regulatory and/or taxing authorities. For example, such regulations regarding licenses may be published by the licensing regulation authority system 124 to the licensing rules database 112 in the form of rules that may be automatically read and followed by software of the service provider system 134 and/or the licensing interface system 128 of FIG. 1. Also, such regulations regarding registrations may be published by the registration regulation authority system 124 to the registration rules database 114 in the form of rules that may be automatically read and followed by software of the service provider system 134 and/or the registration interface system 126 of FIG. 1.

FIG. 6A illustrates an example interactive graphical user interface showing a respective example license verification failure interface 602. In the event of one or more license verification failures, a message may be generated and communicated to the end user that indicates license verification failure reason(s) 610 depicted in FIG. 6A. For example, license verification failure interface 602 may be an interface provided by the licensing interface system 128. Shown is a selectable "transactions" user interface element 604, a selectable "license verification failures" user interface element 606 and a selectable "registration verification failures" user interface element 608. The license verification failure interface 602 is an example of what may be displayed as a result of a user selecting the "license verification failures" user interface element 606. In an example embodiment, if a license verification fails, it can be the result of one of a few scenarios. The first scenario is that one or more licenses are missing. This may be due to a target product and/or service license type being missing and/or a license with one or more jurisdictions or other domains being missing. The second scenario is that one or more licenses are expired. This may be due to one or more product and/or service license types being expired. Any of these reasons which are applicable to a particular scenario may be displayed as part of the license verification failure reason(s) 610 along with transaction information regarding the applicable transaction. The user may also select the "transactions" user interface element 604 to display and/or select a particular transaction for which the user would like to see the registration or license verification failure reasons.

FIG. 6B illustrates an example interactive graphical user interface showing a respective example registration verification failure interface 612. In the event of one or more registration verification failures, a message may be generated and communicated to the end user that indicates registration verification failure reason(s) 620 depicted in FIG. 6B. For example, registration verification failure interface 612 may be an interface provided by the registration interface system 126. Shown is a selectable "transactions" user interface element 604, a selectable "license verification failures" user interface element 606 and a selectable "registration verification failures" user interface element 608. The registration verification failure interface 612 is an example of what may be displayed as a result of a user selecting the "registration verification failures" user interface element 608. In an example embodiment, if a registration verification fails, it can be the result of one of a few scenarios. The first scenario is that one or more registrations are missing. This may be due to a target product and/or service registration type being missing and/or a registration with one or more jurisdictions or other domains being missing. The second scenario is that one or more registrations are expired. This may be due to one or more product and/or service registration types being expired. Any of these reasons which are applicable to a particular scenario may be displayed as part of the registration verification failure reason(s) 620 along with transaction information regarding the applicable transaction.

Figure 7A:
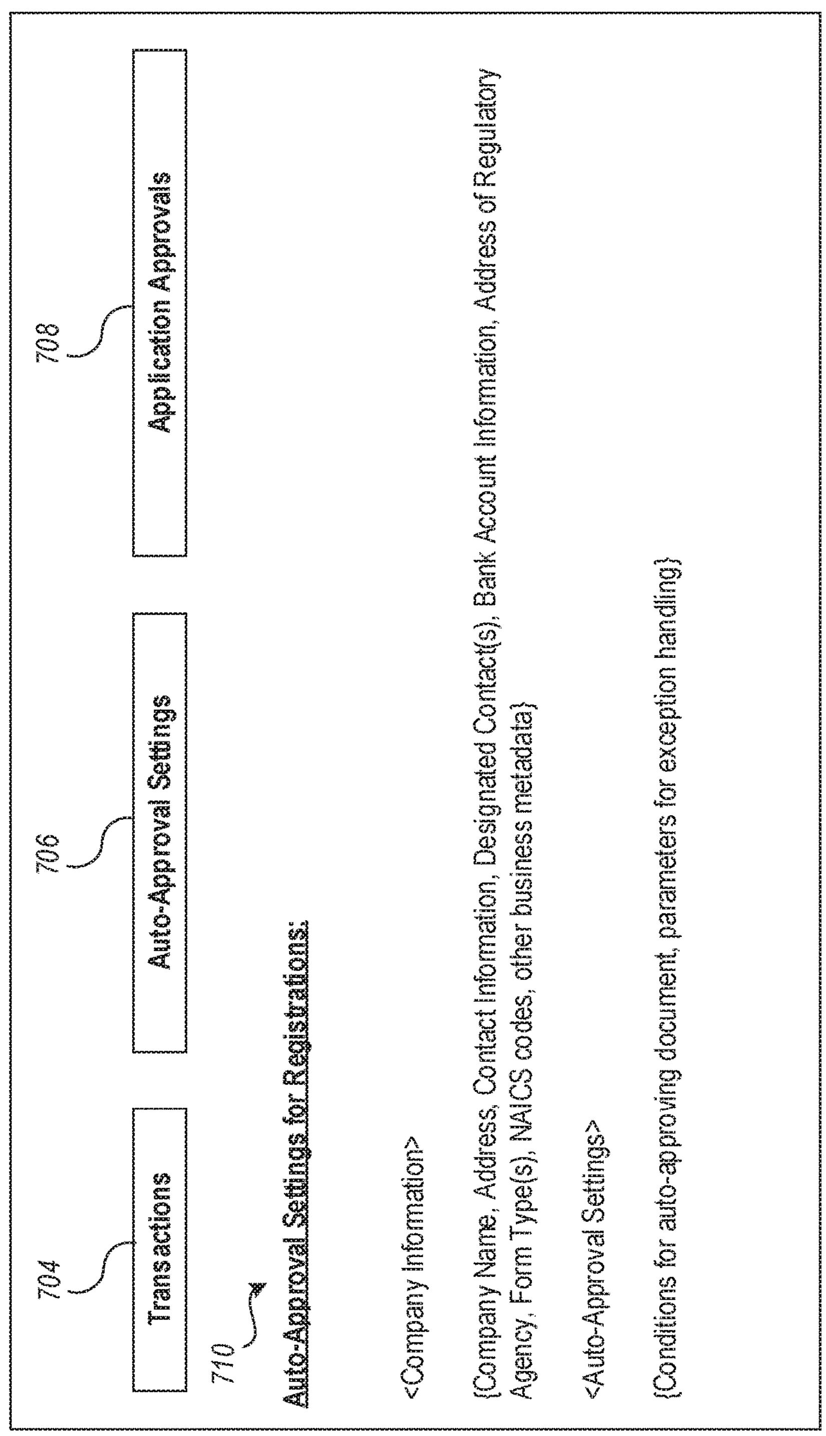
FIG. 7A is an illustration of an example interactive graphical user interface (UI) showing an example of how the user may configure the auto-approval of registrations via a client UI that is an improvement in automated computerized systems, according to various embodiments of the present disclosure.

FIG. 7A is an illustration of an example interactive graphical user interface (UI) showing an example registration auto-approval configuration interface 702 illustrating how a user may configure the auto-approval of registrations via a client UI that is an improvement in automated computerized systems, according to various embodiments of the present disclosure. Shown is a selectable "Transactions" user interface element 704, a selectable "Auto-Approval Settings" user interface element 706 and a selectable "Application Approvals" user interface element 708. A user, such as an administrative user of a seller system 106, buyer system 104, service provider system 134 and/or registration regulation authority system 120, may select the "auto-approval settings" user interface element 706 to set conditions for which registration applications may be automatically approved. Alternatively, users can configure these settings at the API level. The "Auto-Approval Settings for Registrations:" portion 710 is an example of what may be displayed as a result of a user selecting the "auto-approval settings" user interface element 706. Shown as part of the "Auto-Approval Settings for Registrations:" section 710 is company information regarding the company of the seller or provider of goods and/or services that would be submitting a registration application and selectable settings for selecting conditions for automatic approval of registration applications for that company. Examples of information regarding the company of the seller or provider of goods and/or services that would be submitting a registration application include, but are not limited to: company name, address, contact information, designated contact(s), bank account information, address of regulatory agency, form type(s), NAICS codes, other business metadata and transaction information. Selectable parameters for exception handling may also be provided. Some examples of selectable requirements or conditions for which registration applications may be automatically approved include, but are not limited to: whether there is adequate information on the ownership structure of the company or firm involved in the transaction; whether there are valid identifiers of products, labels, marks and/or services generated by regulation authority systems; whether there is valid information regarding brand, trademark, service mark, appellation, vintage, bottle size, and/or fanciful name, etc.; and whether the seller or provider of goods or services associated with the transaction has any outstanding compliance violations. The user may also select the "transactions" user interface element 704 to display and/or select particular transactions for which the user would like to see the auto-approval settings for registrations.

Figure 7B:
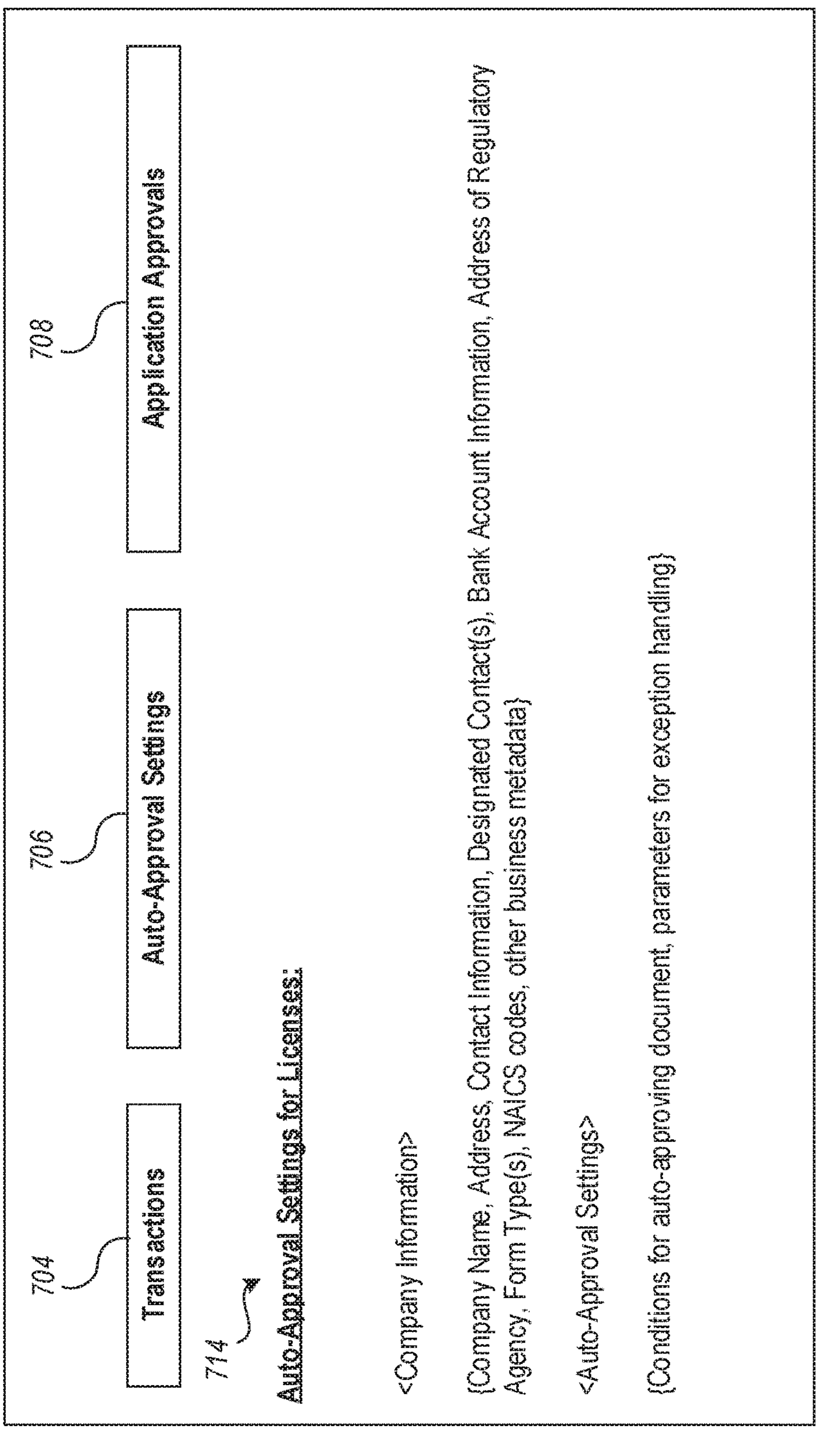
FIG. 7B is an illustration of an example interactive graphical UI showing an example of how the user may configure the auto-approval of licenses via a client UI that is an improvement in automated computerized systems, according to various embodiments of the present disclosure.

FIG. 7B is an illustration of an example interactive graphical user interface (UI) showing an example license auto-approval configuration interface 712 illustrating how a user may configure the auto-approval of licenses via a client UI that is an improvement in automated computerized systems, according to various embodiments of the present disclosure. Shown is a selectable "Transactions" user interface element 704, a selectable "Auto-Approval Settings" user interface element 706 and a selectable "Application Approvals" user interface element 708. A user, such as an administrative user of a seller system 106, buyer system 104, service provider system 134 and/or licensing regulation authority system 124, may select the "auto-approval settings" user interface element 706 to set conditions for which license applications may be automatically approved. Alternatively, users can configure these settings at the API level. The "Auto-Approval Settings for Licenses:" portion 714 is an example of what may be displayed as a result of a user selecting the "auto-approval settings" user interface element 706. Shown as part of the "Auto-Approval Settings for Licenses:" section 714 is company information regarding the company of the seller or provider of goods and/or services that would be submitting a license application and selectable settings for selecting conditions for automatic approval of license applications for that company. Examples of information regarding the company of the seller or provider of goods and/or services that would be submitting a license application include, but are not limited to: company name, address, contact information, designated contact(s), bank account information, address of regulatory agency, form type(s), NAICS codes, other business metadata and transaction information. In various embodiments, auto-approval settings for licensing may also or instead be shown. Selectable parameters for exception handling may also be provided. Some examples of selectable requirements or conditions for which license applications may be automatically approved include, but are not limited to: whether there is adequate information on the ownership structure of the company or firm involved in the transaction; whether there are valid identifiers of products, labels, marks and/or services generated by regulation authority systems; whether there is valid information regarding brand, trademark, service mark, appellation, vintage, bottle size, and/or fanciful name, etc.; and whether the seller or provider of goods or services associated with transaction has any outstanding compliance violations. The user may also select the "transactions" user interface element 704 to display and/or select particular transactions for which the user would like to see the auto-approval settings for licenses.

Figure 8:
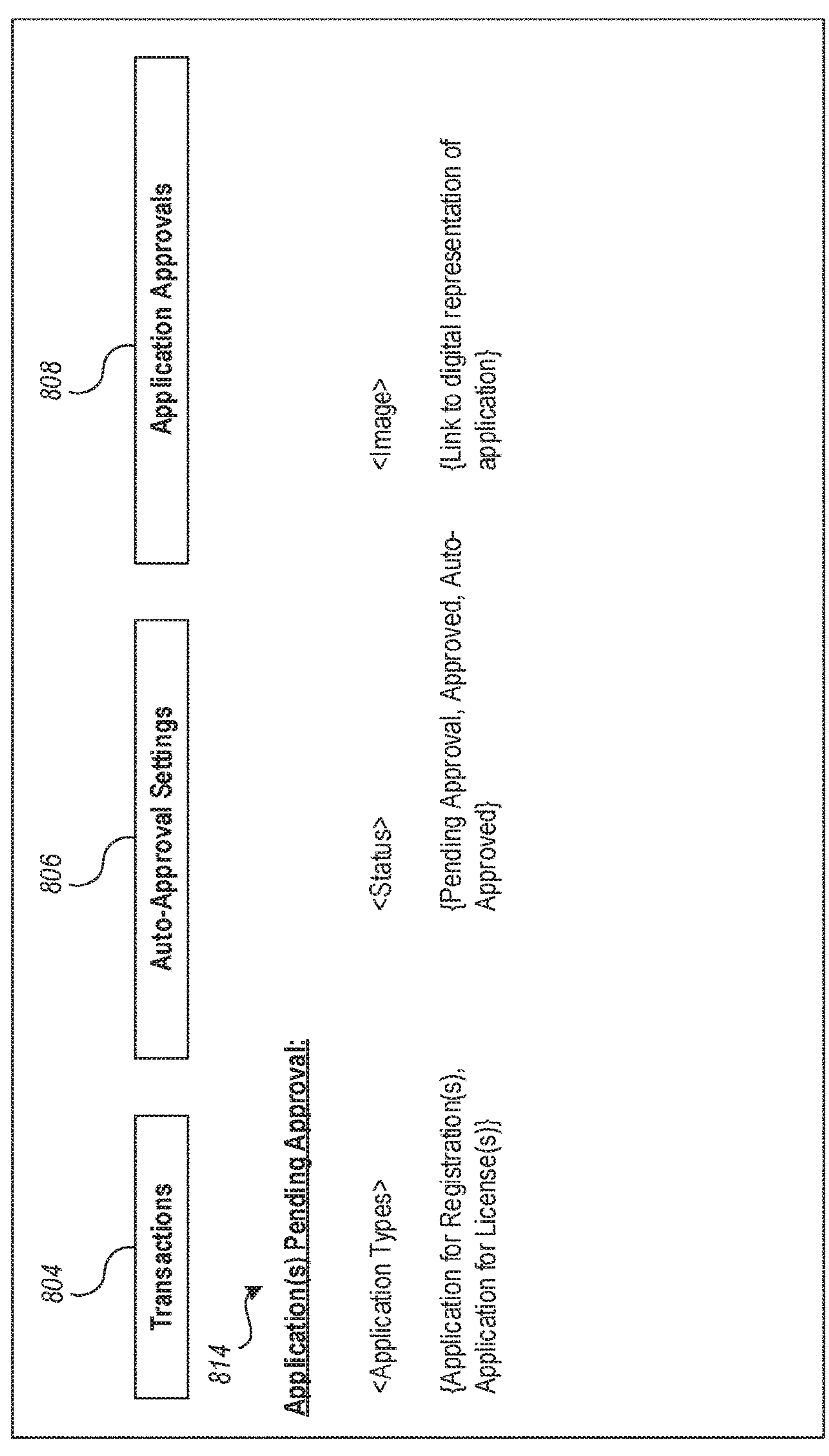
FIG. 8 is an illustration of an example interactive graphical UI showing an example of how a client may be notified by using a private UI of the status of all applications for licenses and registrations that is an improvement in automated computerized systems, according to various embodiments of the present disclosure.

FIG. 8 is an illustration of an example interactive graphical UI showing an application approvals user interface 802 illustrating an example of how a client may be notified by using a private UI of the status of all applications for licenses and registrations, which is an improvement in automated computerized systems, according to various embodiments of the present disclosure. Shown is an "Application(s) Pending Approval" portion 814 of the application approvals user interface 802. The "Application(s) Pending Approval" portion 814 is an example of what may be displayed as a result of a user selecting the "Application Approvals" user interface element 808. Shown as part of the "Application(s) Pending Approval" portion 814 is a list of all the applications pending approval, along with their associated application type (e.g., license or registration), status (e.g., "Pending Approval", "Approved", "Auto-Approved") and a digital image, or link to a digital image, of the applicable application. Additional or different application information may be displayed in various other embodiments.

Figure 9:
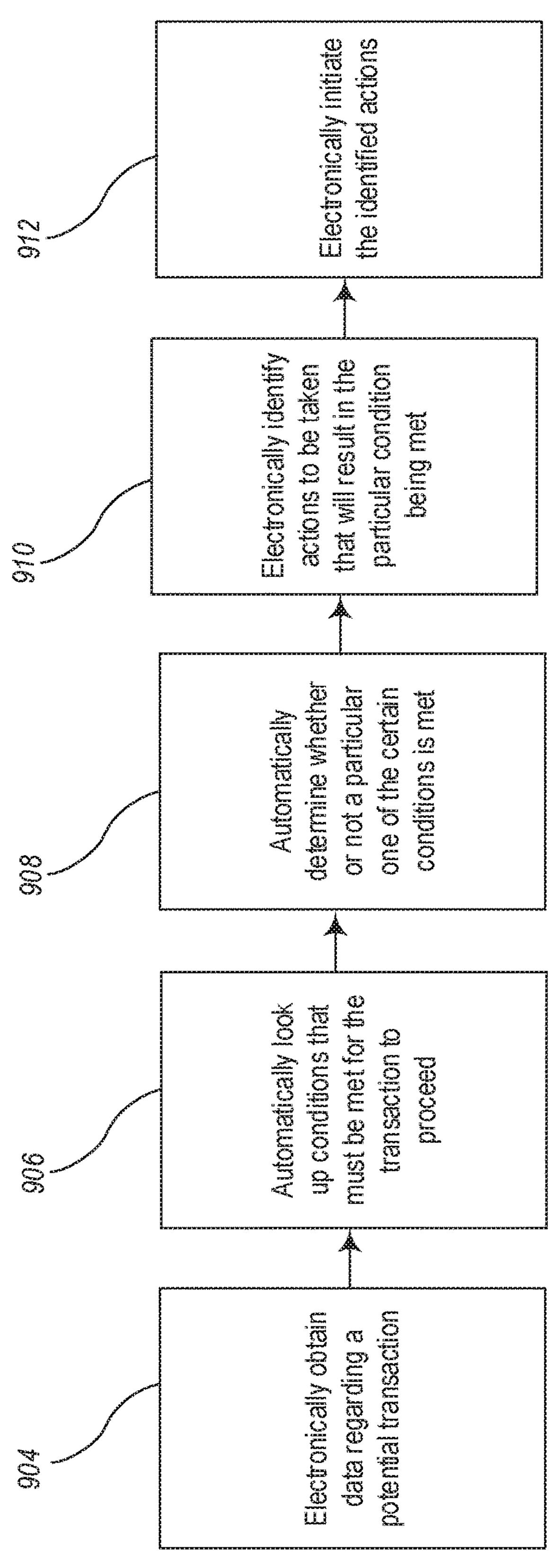
FIG. 9 is a flow diagram of an example method for facilitating transactions that is an improvement in automated computerized systems, according to various embodiments of the present disclosure.

FIG. 9 is a flow diagram of an example method 902 for facilitating transactions that is an improvement in automated computerized systems, according to various embodiments of the present disclosure.

At 904, the system 102 electronically obtains data regarding a potential transaction.

At 906, the system 102, based on the data regarding the potential transaction, automatically looks up one or more certain conditions that must be met for the transaction to proceed.

At 908, the system 102 automatically determines whether or not a particular one of the one or more certain conditions is met.

At 910, in response to a determination that the particular condition is not met, the system 102 electronically identifies actions to be taken that will result in the particular condition being met for the potential transaction to proceed.

At 912, also in response to a determination that the particular condition is not met, the system 102 electronically initiates the identified actions to be taken.

Figure 10:
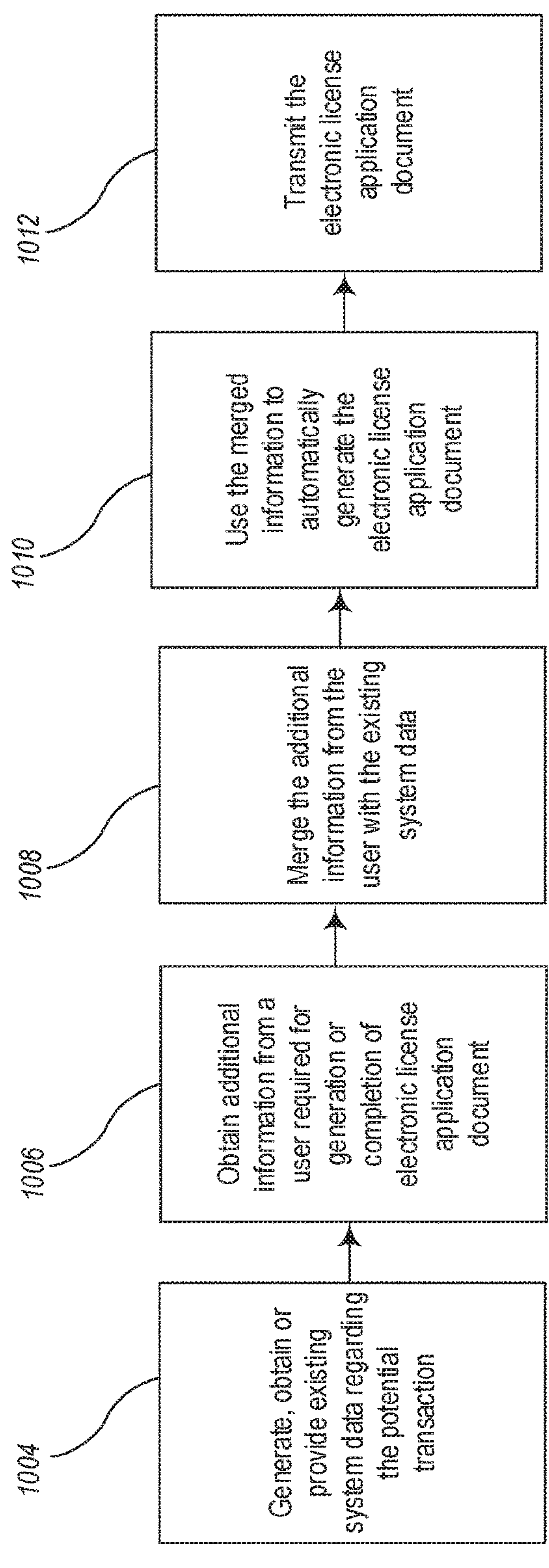
FIG. 10 is a flow diagram of an example method for facilitating transactions by automatically generating and transmitting electronic license application documents that is an improvement in automated computerized systems, according to various embodiments of the present disclosure.

FIG. 10 is a flow diagram of an example method 1002 for facilitating transactions by automatically generating and transmitting electronic license application documents that is an improvement in automated computerized systems, according to various embodiments of the present disclosure.

At 1004, the system 102 electronically generates, obtains or provides existing system data regarding the potential transaction.

At 1006, the system 102 electronically obtains additional information from a user, in addition to the existing system data, that is required for generation or completion of the electronic license application document. The additional information may include, but is not limited to, one or more of: documents regarding the potential transaction, documents regarding one or more parties involved in the potential transaction, business information regarding a business involved in the potential transaction, personal information regarding one or more parties involved in the potential transaction, fulfillment operations information, information regarding an origin or destination of a product or service involved in the potential transaction, and information regarding a product or service involved in the potential transaction.

At 1008, the system 102 electronically merges the additional information from the user with the existing system data.

At 1010, the system electronically uses the additional information from the user merged with the existing system data to automatically generate the electronic license application document. For example, in one embodiment, in instances where new or other additional data is required, existing information will be used to pre-fill the license application and an administrative user goes into the system 102 to satisfy missing data requirements, which will be merged with the existing information that is pre-filled in the license application.

At 1012, the system 102 electronically transmits the electronic license application document to one or more of: a system of an entity involved in the transaction and a system of an authority that issues license documents in a domain associated with the transaction. The system 102 may also electronically communicate to a system of a user, via a web-based user interface, a stage or status of the electronic license application document.

Figure 11:
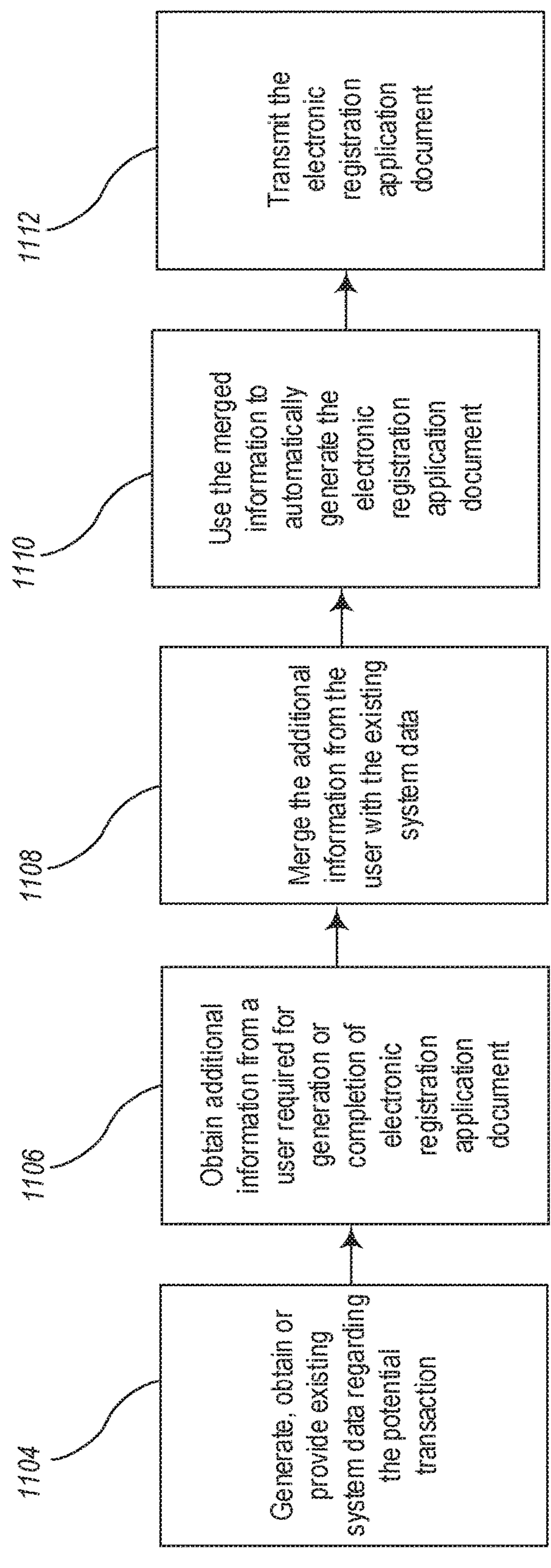
FIG. 11 is a flow diagram of an example method for facilitating transactions by automatically generating and transmitting electronic registration application documents that is an improvement in automated computerized systems, according to various embodiments of the present disclosure.

FIG. 11 is a flow diagram of an example method 1102 for facilitating transactions by automatically generating and transmitting electronic registration application documents that is an improvement in automated computerized systems, according to various embodiments of the present disclosure.

At 1104, the system 102 electronically generates, obtains or provides existing system data regarding the potential transaction.

At 1106, the system 102 electronically obtains additional information from a user, in addition to the existing system data, that is required for generation or completion of the electronic registration application document. The additional information may include, but is not limited to, one or more of: documents regarding the potential transaction, documents regarding one or more parties involved in the potential transaction, business information regarding a business involved in the potential transaction, personal information regarding one or more parties involved in the potential transaction, fulfillment operations information, information regarding an origin or destination of a product or service involved in the potential transaction, and information regarding a product or service involved in the potential transaction.

At 1108, the system 102 electronically merges the additional information from the user with the existing system data.

At 1110, the system electronically uses the additional information from the user merged with the existing system data to automatically generate the electronic registration application document. For example, in one embodiment, in instances where new or other additional data is required, existing information will be used to pre-fill the registration application and an administrative user goes into the system 102 to satisfy missing data requirements, which will be merged with the existing information that is pre-filled in the registration application.

At 1112, the system 102 electronically transmits the electronic registration application document to one or more of: a system of an entity involved in the transaction and a system of an authority that issues registration documents in a domain associated with the transaction. The system 102 may also electronically communicate to a system of a user, via a web-based user interface, a stage or status of the electronic registration application document.

ADDITIONAL DETAILS

Additional details about the components of FIG. 2 are now provided. The system controller 210 controls operation of the components in memory 201 of FIG. 2 and performs the functions of the system computer 202, as discussed herein. In an example embodiment, the system controller 210 and/or computer-executable instructions stored on memory 201 of the system computer 202 are implemented using various programming techniques. For example, the system controller 210 and/or computer-executable instructions stored on memory 201 of the system computer 202 may be implemented as a "native" executable running on CPU 203, along with one or more static or dynamic libraries. In other embodiments, the system controller 210 and/or computer-executable instructions stored on memory 201 of the system computer 202 may be implemented as instructions processed by a virtual machine that executes as some other program. In general, a range of programming languages may be employed for implementing such example embodiments, including representative implementations of various programming language paradigms and platforms, including but not limited to, object-oriented (e.g., Java, C++, C #, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, PHP, Python, JavaScript, VBScript, and the like) and declarative (e.g., SQL, Prolog, and the like).

The embodiments described above may also use synchronous or asynchronous client-server computing techniques, including software as a service (SaaS) techniques. However, the various components may be implemented using more monolithic programming techniques as well, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously, and communicate using message passing techniques. Equivalent synchronous embodiments are also supported. Also, other functions could be implemented and/or performed by each component/module, and in different orders, and by different components/modules, yet still achieve the functions of the systems and methods described herein.

In addition, programming interfaces to the data stored as part of the system controller 210 and other system components described herein may be available by mechanisms such as through C, C++, C #, and Java APIs; libraries for accessing files, databases, or other data repositories; through scripting languages such as JavaScript and VBScript; or through Web servers, FTP servers, or other types of servers providing access to stored data. The system controller 210 and other system components may be implemented by using one or more database systems, file systems, or any other technique for storing such information, or any combination of the above, including implementations using distributed computing techniques.

Different configurations and locations of programs and data are contemplated for use with techniques described herein. A variety of distributed computing techniques are appropriate for implementing the components of the embodiments in a distributed manner including but not limited to TCP/IP sockets, RPC, RMI, HTTP, Web Services (XML-RPC, JAX-RPC, SOAP, and the like). Other variations are possible. Also, other functionality may be provided by each component/module, or existing functionality could be distributed amongst the components/modules in different ways, yet still achieve the functions described herein.

Furthermore, in some embodiments, some or all of the components/portions and/or functionality provided by the computer-executable instructions stored on memory 201 may be implemented or provided in other manners, such as at least partially in firmware and/or hardware, including, but not limited to one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network or cellular wireless network; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Such computer program products may also take other forms in other embodiments. Accordingly, embodiments of this disclosure may be practiced with other computer system configurations.

The hardware elements depicted in system computer 202 are not intended to be exhaustive. Rather, they are representative, for highlighting essential components that can be used with embodiments.

Instructions for performing any of the methods or functions described herein may be stored, completely or partially, within the memory components of system computer 202. These memory components include the indicated memory components, plus cache memory within the processors such as CPU 203. Accordingly, these memory components are examples of machine-readable media.

In this context, "machine-readable medium" or "computer-readable medium" refers to a component, device or other tangible media able to store instructions and data temporarily or permanently and may include, but is not limited to, a portable computer diskette, a thumb drive, a hard disk, random-access memory (RAM), read-only memory (ROM), buffer memory, flash memory, optical media, magnetic media, cache memory, an Erasable Programmable Read-Only Memory (EPROM), an optical fiber, a portable compact disc read-only memory (CD-ROM), an optical storage device, a magnetic storage device, or any suitable combination of the foregoing.

The term "machine-readable medium" or "computer-readable medium" should be taken to include a single medium or multiple media (e.g., a centralized or distributed database, or associated caches and servers) able to store instructions that a machine such as a processor can store, erase, or read. The term "machine-readable medium" or "computer-readable medium" shall also be taken to include any medium, or combination of multiple media, that is capable of storing instructions (e.g., code) for execution by a machine, such that the instructions, when executed by one or more processors of the machine, cause the machine to perform any one or more of the methods described herein. Accordingly, instructions transform a general, non-programmed machine into a particular machine programmed to carry out the described and illustrated functions in the manner described.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

CPU 203 is a physical circuit that manipulates physical quantities representing data values. The manipulation can be according to control signals, which can be known as commands, op codes, machine code, etc. The manipulation can produce corresponding output signals that are applied to operate a machine. As such, a processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), a Field-Programmable Gate Array (FPGA), an Application Specific Integrated Circuit (ASIC), any combination of these, and so on. A processor may further be a multi-core processor having two or more independent processors that execute instructions. Such independent processors are sometimes called "cores."

A hardware component such as a processor may also include programmable logic or circuitry that is temporarily configured by software to perform certain operations. For example, a hardware component may include software executed by a general-purpose processor or other programmable processor. Once configured by such software, hardware components become specific machines, or specific components of a machine, uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations.

As used herein, a "component" may refer to a device, physical entity or logic having boundaries defined by function or subroutine calls, branch points, application programming interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components.

Where a phrase similar to "at least one of A, B, or C," "at least one of A, B, and C," "one or more A, B, or C," or "one or more of A, B, and C" is used, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system, including:

at least one processor; and a memory coupled to the at least one processor, the memory storing instructions that, when executed by the at least one processor, cause the system to perform operations including:

electronically obtaining, in real time, data regarding a potential transaction;

based on the data regarding the potential transaction, automatically looking up, in real time, one or more certain conditions that must be met for the transaction to proceed;

automatically determining, in real time, a particular one of the one or more certain conditions is not met; and in response to the determination that the particular condition is not met:

electronically identifying, in real time, actions to be taken that will result in the particular condition being met for the potential transaction to proceed; and electronically enabling the potential transaction to proceed by electronically initiating, in real time, the identified actions to be taken, in which the identified actions to be taken include electronically updating, in real time, information on a certain electronic document to be current, in which the electronically updating, in real time, information on the certain electronic document to be current includes:

electronically transmitting, in real time, a renewal application document to one or more of: a remote system of an entity involved in the transaction and a remote system of an authority that issues registration documents in a domain associated with the transaction;

accessing and performing electronic validation, in real-time, of electronic verification of the renewal application document, wherein the accessing and performing electronic validation, in real-time, of electronic verification of the renewal application document includes:

digitally processing a digital signature originating from the remote system of an entity involved in the transaction or the remote system of an authority that issues license documents in the domain associated with the transaction, wherein the digitally processing the digital signature includes:

electronically associating in an electronic data structure a plurality of electronic entries with the renewal application document;

electronically associating each electronic entry of the plurality of electronic entries with a unique hash or key which is created by a system creating the entry and validated in the electronic data structure by other systems of other entities associated with the transaction; and implementing an approval digital hash or approval key in the electronic data structure based on the electronically associating in the electronic data structure a plurality of electronic entries with the renewal application document and the electronically associating each electronic entry of the plurality of electronic entries with a unique hash or key; and in response to the electronically transmitting the renewal application document, electronically receiving, in real time, an indication that the potential transaction is approved via the accessing and performing electronic validation, in real-time, of electronic verification of the renewal application document.

2. The system of claim 1 in which the electronically receiving the data regarding a potential transaction includes:

receiving data regarding one or more of: product type of a product involved in the potential transaction; service type of a service involved in the potential transaction; price of a service or product involved in the potential transaction; quantity of a service or product involved in the potential transaction; origin of a service or product involved in the potential transaction; destination of a service or product involved in the potential transaction; information regarding a seller of a product or service involved in the potential transaction; information regarding a buyer of a product or service involved in the potential transaction; exemption information regarding product or service involved in the potential transaction; exemption information regarding a type, price or quantity of a product or service involved in the potential transaction; exemption information regarding a buyer or seller involved in the potential transaction; exemption information regarding an origin of a service or product involved in the potential transaction; exemption information regarding a destination of a service or product involved in the potential transaction; identifiers of products, labels, marks or services generated by regulation authority systems; North American Industry Classification System codes; and Certificate of Label Approval/Exemption information.

3. The system of claim 1 in which the automatically determining a particular one of the one or more certain conditions is not met includes:

electronically determining at least a certain license document that, based on the data regarding the potential transaction, should have been stored; and determining whether or not the certain license document is indeed stored.

4. The system of claim 3 in which the automatically determining a particular one of the one or more certain conditions is not met further includes:

in response to determining that the certain license document is indeed stored, reading an expiration date of the certain license document; and determining whether or not the expiration date has passed.

5. The system of claim 4 in which the automatically determining a particular one of the one or more certain conditions is not met further includes:

in response to determining that the expiration date has not passed, reading information on the certain license document regarding a seller of the transaction; and determining whether the information on the certain license document regarding the seller is current.

6. The system of claim 5 in which the actions to be taken include an action that will result in modification of the certain license document to update the information on the certain license document regarding the seller to be current.

7. The system of claim 1 in which the automatically determining a particular one of the one or more certain conditions is not met includes:

electronically determining at least a certain registration document that, based on the data regarding the potential transaction, should have been stored; and determining whether or not the certain registration document is indeed stored.

8. The system of claim 7 in which the automatically determining a particular one of the one or more certain conditions is not met further includes:

in response to determining that the certain registration document is indeed stored, reading an expiration date of the certain registration document; and determining whether or not the expiration date has passed.

9. The system of claim 8 in which the automatically determining a particular one of the one or more certain conditions is not met further includes:

in response to determining that the expiration date has not passed, reading information on the certain registration document regarding a product identified in the transaction; and determining whether the information on the certain registration document regarding the product identified in the transaction is current.

10. The system of claim 9 in which the actions to be taken include an action that will result in revision of the certain registration document to update the information on the registration document regarding the product identified in the transaction to be current.

11. The system of claim 1 in which the actions to be taken include actions that will result in generation and completion of an electronic license application document to be filed with an entity for obtaining a license for the transaction to be processed.

12. The system of claim 11 in which the electronically initiating the identified actions to be taken includes:

electronically generating, obtaining or providing existing system data regarding the potential transaction;

electronically obtaining additional information from a user, in addition to existing system data, that is required for generation or completion of the electronic license application document; and electronically merging the additional information from the user with the existing system data.

13. The system of claim 12 in which the electronically initiating the identified actions to be taken further include:

electronically using the additional information from the user merged with the existing system data to automatically generate the electronic license application document.

14. The system of claim 12 in which the additional information includes one or more of:

documents regarding the potential transaction, documents regarding one or more parties involved in the potential transaction, business information regarding a business involved in the potential transaction, personal information regarding one or more parties involved in the potential transaction, fulfillment operations information, information regarding an origin or destination of a product or service involved in the potential transaction, and information regarding a product or service involved in the potential transaction.

15. The system of claim 12 in which the electronic license application document is a renewal application document and in which the electronically initiating the identified actions to be taken includes:

automatically generating renewal documents for the renewal application document based on the existing system data;

electronically presenting the automatically generated renewal documents to a system of an authorized user for final approval;

electronically receiving final approval from the system of the authorized user;

electronically generating the renewal application document in response to the final approval from the system of the authorized user;

electronically transmitting the renewal application document to one or more of: a system of an entity involved in the transaction and a system of an authority that issues license documents in a domain associated with the transaction; and in response to the electronically transmitting the renewal application document, electronically receiving an indication that the potential transaction is approved via receiving an indication of a digital signature or hash originating from the system of an entity involved in the transaction or the system of an authority that issues license documents in the domain associated with the transaction.

16. The system of claim 12 in which the electronically initiating the identified actions to be taken includes:

electronically transmitting the electronic license application document to one or more of: a system of an entity involved in the transaction and a system of an authority that issues license documents in a domain associated with the transaction; and electronically communicating to a system of a user, via a web-based user interface, a stage or status of the electronic license application document.

17. The system of claim 12 in which the electronically initiating the identified actions to be taken includes:

electronically communicating, to a system of a user, a requirement of a physical presence of the user or another person at a particular location to apply for or process the electronic license application document.

18. The system of claim 1 in which the actions to be taken include actions that will result in generation and completion of an electronic registration application document to be filed with an entity for obtaining a registration regarding a party, product or service of the transaction in order for the transaction to be processed.

19. The system of claim 18 in which the electronically initiating the identified actions to be taken includes:

electronically generating, obtaining or providing existing system data regarding the potential transaction;

electronically obtaining additional information from a user, in addition to existing system data, that is required for generation or completion of the electronic registration application document; and electronically merging the additional information from the user with the existing system data.

20. The system of claim 19 in which the electronically initiating the identified actions to be taken further includes:

electronically using the additional information from the user merged with the existing system data to automatically generate the electronic registration application document.

21. The system of claim 19 in which the electronic registration application document is the renewal application document and in which the electronically initiating the identified actions to be taken further includes:

automatically generating renewal documents for the renewal application document based on the existing system data;

electronically presenting the automatically generated renewal documents to a system of an authorized user for final approval;

electronically receiving final approval from the system of the authorized user;

electronically generating the renewal application document in response to the final approval from the system of the authorized user.

22. The system of claim 19 in which the electronically initiating the identified actions to be taken includes:

electronically transmitting the electronic registration application document to one or more of: the remote system of an entity involved in the transaction and the remote system of an authority that issues registration documents in a domain associated with the transaction; and electronically communicating to a system of a user, via a web-based user interface, a stage or status of the electronic registration application document.

23. The system of claim 19 in which the electronically initiating the identified actions to be taken includes:

electronically communicating to a system of a user a requirement of a physical presence of the user or another person at a particular location to apply for or process the electronic registration application document.

24. The system of claim 1 in which the computer-executable instructions, when executed by at least one processor, further cause the system to perform operations including: electronically completing the identified actions to be taken.

25. The system of claim 1 in which the computer-executable instructions, when executed by at least one processor, further cause the system to perform operations including:

causing the transaction to be electronically processed based on the initiating of the identified actions to be taken.

26. The system of claim 1 in which the electronically initiating the identified actions to be taken includes:

electronically initiating creation of applicable license types for domains applicable to the potential transaction based on the data regarding the potential transaction.

27. The system of claim 1 in which the identified actions to be taken include electronically generating, obtaining or providing data regarding one or more of: North American Industry Classification System codes and Certificate of Label Approval/Exemption information.

28. The system of claim 1 in which the actions to be taken include electronic initiation of remittance of a fee for an application for, renewal of or updating of a license or registration document that will result in the particular condition being met for the potential transaction to proceed.

* * * * *